US012811709B2

(12) United States Patent
Nakamura

(10) Patent No.: US 12,811,709 B2
(45) Date of Patent: Nov. 24, 2026

(54) OPTICAL TRANSMISSION CONTROL APPARATUS, OPTICAL TRANSMISSION SYSTEM, AND METHOD FOR OPTICAL TRANSMISSION CONTROL APPARATUS

(71) Applicant: NEC Corporation, Tokyo (JP)

(72) Inventor: Toshifumi Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 18/904,435

(22) Filed: Oct. 2, 2024

(65) Prior Publication Data

US 2025/0158732 A1 May 15, 2025

(30) Foreign Application Priority Data

Nov. 9, 2023 (JP) ................................ 2023-191692

(51) Int. Cl.
*H04J 14/02* (2006.01)
*H04B 10/079* (2013.01)
*H04Q 11/00* (2006.01)

(52) U.S. Cl.
CPC ...... *H04J 14/0267* (2013.01); *H04B 10/0795* (2013.01); *H04J 14/0212* (2013.01); *H04J 14/0216* (2013.01); *H04Q 11/0005* (2013.01); *H04J 2203/0067* (2013.01); *H04J 2203/0069* (2013.01); *H04Q 2011/0081* (2013.01); *H04Q 2011/0086* (2013.01)

(58) Field of Classification Search
CPC .............. H04B 10/0795; H04J 14/0267; H04J 14/0212; H04J 14/0216; H04J 2203/0067; H04J 2203/0069; H04Q 11/0005; H04Q 2011/0081; H04Q 2011/0086
USPC ........................................ 398/25, 34, 45, 48
See application file for complete search history.

(56) References Cited

U.S. PATENT DOCUMENTS

2001/0017960 A1* 8/2001 Terahara ............. H04J 14/0216 385/24
2003/0067653 A1* 4/2003 Aicklen .................. H04L 45/00 398/101
2009/0290873 A1* 11/2009 Takita ................. H04J 14/0213 398/79
2018/0115485 A1* 4/2018 Chiba ..................... H04L 45/74

FOREIGN PATENT DOCUMENTS

JP H11-218729 A 8/1999

* cited by examiner

*Primary Examiner* — Li Liu
(74) *Attorney, Agent, or Firm* — Sughrue Mion, PLLC

(57) ABSTRACT

An optical transmission control apparatus according to the present disclosure includes: a selecting unit configured to select a saturated optical transmission path of which an optical transmission usage ratio exceeds a first threshold from among a plurality of optical transmission paths connected between a first optical transmission apparatus and a second optical transmission apparatus; a specifying unit configured to specify an evacuation optical transmission path of which an optical transmission direction is opposite to that of the saturated optical transmission path and of which an optical transmission usage ratio is lower than a second threshold from among the plurality of optical transmission paths; and a control unit configured to transmit a transfer control signal for transferring data to be transmitted through a counterpart optical transmission path to the evacuation optical transmission path, the counterpart optical transmission path being an optical transmission path.

15 Claims, 18 Drawing Sheets

OPTICAL TRANSMISSION CONTROL APPARATUS, OPTICAL TRANSMISSION SYSTEM, AND METHOD FOR OPTICAL TRANSMISSION CONTROL APPARATUS

INCORPORATION BY REFERENCE

This application is based upon and claims the benefit of priority from Japanese patent application No. 2023-191692, filed on Nov. 9, 2023, the disclosure of which is incorporated herein in its entirety by reference.

TECHNICAL FIELD

The present disclosure relates to an optical transmission control apparatus, an optical transmission system, a method for an optical transmission control apparatus, and a program. In particular, the present disclosure relates to an optical transmission control apparatus, an optical transmission system, a method for an optical transmission control apparatus, and a program capable of changing the transmission capacities of optical transmission lines based on the amounts of data to be transmitted therethrough.

BACKGROUND ART

In general, a core network or a metro network for optical communication (optical transmission) is operated by using an uplink fiber and a downlink fiber as a pair, in which the communication capacity (transmission capacity) of each fiber is fixed.

In such a case, there is a problem that when, as a result of an increase in an amount of traffic (data), an imbalance occurs between the amount of data to be transmitted through the uplink and that to be transmitted through the downlink, and the amount of data, for example, in the downlink becomes so large that it reaches the transmitting capacity thereof, a new fiber pair has to be laid (e.g., installed), even when the total transmitting capacity of the uplink and downlink is large enough to enable the total amount of the data to be transmitted.

Patent Literature 1 (Japanese Unexamined Patent Application Publication No. H11-218729) discloses that "comprising: an optical device including one input/output terminal pair including a pair of input/output terminals and another input/output terminal pair including a pair of input/output terminals, and having a bidirectional variable filter function configured so that when a plurality of optical signals having different wavelengths are input from one input/output terminal included in either one of the input/output terminal pairs, some of the optical signals are output from one input/output terminal included in the input/output terminal pair to which the optical signals are not input, and the remaining optical signals are output from the other input/output terminal included in the input/output terminal pair to which the optical signals are not input; and a first optical signal path switching unit connected to the optical device, and configured to switch an optical signal input/output path between the optical device and bidirectional optical signal transmission means by using an optical circulator".

Patent Literature 1 discloses neither that when an imbalance occurs between the amount of data to be transmitted through the uplink and that in the downlink, the transmission capacities of the uplink and downlink optical transmission paths are flexibly changed by switching the optical transmission direction, nor that the transmission capacities of the optical transmission lines are changed based on the amounts of data to be transmitted therethrough. As described above, there is a problem that when an imbalance occurs between the amounts of data to be transmitted, a new optical fiber pair has to be laid (e.g., installed).

In order to solve the problem described above, an object of the present disclosure is to provide an optical transmission control apparatus, an optical transmission system, a method for an optical transmission control apparatus, and a program capable of changing the transmission capacities of optical transmission lines based on the amounts of data to be transmitted therethrough.

SUMMARY

An optical transmission control apparatus according to the present disclosure includes:

a selecting unit configured to select a saturated optical transmission path of which an optical transmission usage ratio exceeds a first threshold from among a plurality of optical transmission paths connected between a first optical transmission apparatus and a second optical transmission apparatus;

a specifying unit configured to specify an evacuation optical transmission path of which an optical transmission direction is opposite to that of the saturated optical transmission path and of which an optical transmission usage ratio is lower than a second threshold from among the plurality of optical transmission paths;

a control unit configured to transmit, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path; and a path-direction switching unit configured to transmit a switching control signal for switching the optical transmission direction of the counterpart optical transmission path to an opposite direction to the first and second optical transmission apparatuses after the transfer of the data to be transmitted through the counterpart optical transmission path is completed, in which the control unit transmits, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

An optical transmission system according to the present disclosure includes: a first optical transmission apparatus, a second optical transmission apparatus, a plurality of optical transmission paths connected between the first and second optical transmission apparatuses, and an optical transmission control apparatus configured to control the first and second optical transmission apparatuses, in which the plurality of optical transmission paths include at least a first optical transmission path and a second optical transmission path, in the first optical transmission path, a first downlink optical transmission path from the first optical transmission apparatus toward the second optical transmission apparatus and a first uplink optical transmission path from the second optical transmission apparatus toward the first optical transmission apparatus form a pair, in the second optical transmission path, a second downlink optical transmission path from the first optical transmission apparatus toward the second optical transmission apparatus and a second uplink optical transmission path from the second optical transmission apparatus toward the first optical transmission apparatus form a pair, the optical transmission control apparatus includes:

a selecting unit configured to select a saturated optical transmission path of which an optical transmission usage ratio exceeds a first threshold from among the plurality of optical transmission paths;

a specifying unit configured to specify an evacuation optical transmission path of which an optical transmission direction is opposite to that of the saturated optical transmission path and of which an optical transmission usage ratio is lower than a second threshold from among the plurality of optical transmission paths;

a control unit configured to transmit, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path; and a path-direction switching unit configured to transmit a switching control signal for switching the optical transmission direction of the counterpart optical transmission path to an opposite direction to the first and second optical transmission apparatuses after the transfer of the data to be transmitted through the counterpart optical transmission path is completed, the control unit transmits, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction, the first optical transmission apparatus includes a first optical switching unit, a first downlink wavelength selecting switching unit, and a first uplink wavelength selecting switching unit, the first optical transmission apparatus further includes a first optical control unit configured to control the first optical switching unit and the first downlink wavelength selecting switching unit or the first uplink wavelength selecting switching unit in order to transfer data to be transmitted through the counterpart optical transmission path based on the transfer control signal so that the data is transmitted through the evacuation optical transmission path, the first optical transmission apparatus further includes a first optical transmission/reception switching unit configured to control the first optical switching unit and the first downlink wavelength selecting switching unit or the first uplink wavelength selecting switching unit in order to switch the optical transmission direction of the counterpart optical transmission path to an opposite direction based on the switching control signal after the transfer of the data to be transmitted through the counterpart optical transmission path is completed, the first control unit sorts out part of the data to be transmitted through the saturated optical transmission path to the counterpart optical transmission path based on the sorting-out control signal after the optical transmission direction of the counterpart optical transmission path is switched to the opposite direction, the second optical transmission apparatus includes a second optical switching unit, a second downlink wavelength selecting switching unit, and a second uplink wavelength selecting switching unit, the second optical transmission apparatus further includes a second optical control unit configured to control the second optical switching unit and the second downlink wavelength selecting switching unit or the second uplink wavelength selecting switching unit in order to transfer data to be transmitted through the counterpart optical transmission path based on the transfer control signal so that the data is transmitted through the evacuation optical transmission path, the second optical transmission apparatus further includes a second optical transmission/reception switching unit configured to control the second optical switching unit and the second downlink wavelength selecting switching unit or the second uplink wavelength selecting switching unit in order to switch the optical transmission direction of the counterpart optical transmission path to an opposite direction based on the switching control signal after the transfer of the data to be transmitted through the counterpart optical transmission path is completed, and the second control unit sorts out part of the data to be transmitted through the saturated optical transmission path to the counterpart optical transmission path based on the sorting-out control signal after the optical transmission direction of the counterpart optical transmission path is switched to the opposite direction.

A method for an optical transmission control apparatus according to the present disclosure includes:

selecting a saturated optical transmission path of which an optical transmission usage ratio exceeds a first threshold from among a plurality of optical transmission paths connected between a first optical transmission apparatus and a second optical transmission apparatus;

specifying an evacuation optical transmission path of which an optical transmission direction is opposite to that of the saturated optical transmission path and of which an optical transmission usage ratio is lower than a second threshold from among the plurality of optical transmission paths;

transmitting, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path;

transmitting a switching control signal for switching the optical transmission direction of the counterpart optical transmission path to an opposite direction to the first and second optical transmission apparatuses after the transfer of the data to be transmitted through the counterpart optical transmission path is completed; and transmitting, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

A program according to the present disclosure causes a computer to perform:

selecting a saturated optical transmission path of which an optical transmission usage ratio exceeds a first threshold from among a plurality of optical transmission paths connected between a first optical transmission apparatus and a second optical transmission apparatus;

specifying an evacuation optical transmission path of which an optical transmission direction is opposite to that of the saturated optical transmission path and of which an optical transmission usage ratio is lower than a second threshold from among the plurality of optical transmission paths;

transmitting, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path;

transmitting a switching control signal for switching the optical transmission direction of the counterpart optical transmission path to an opposite direction to the first and second optical transmission apparatuses after the transfer of the data to be transmitted through the counterpart optical transmission path is completed; and transmitting, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

BRIEF DESCRIPTION OF DRAWINGS

The above and other aspects, features and advantages of the present disclosure will become more apparent from the following description of certain exemplary example embodiments when taken in conjunction with the accompanying drawings, in which.

EXAMPLE EMBODIMENT

Figure 1:
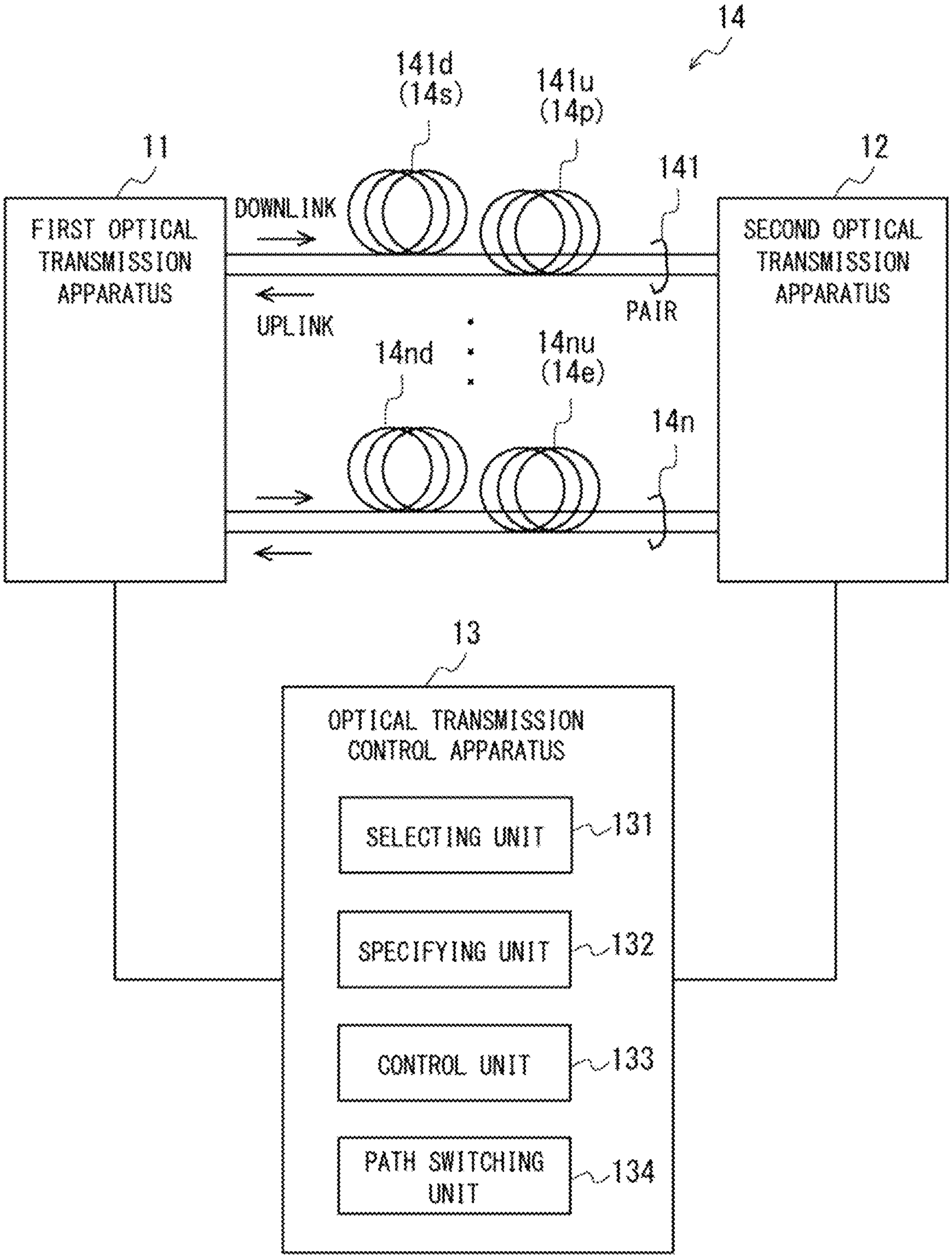
FIG. 1 is a block diagram showing an example of an optical transmission control apparatus according to the present disclosure.

An example embodiment according to the present disclosure will be described hereinafter with reference to the drawings. The same or corresponding elements are assigned the same reference numerals (or symbols) throughout the drawings, and redundant explanations thereof will be omitted as required for clarifying explanations thereof.

First Example Embodiment

<Configuration of Optical Transmission Control Apparatus>

An example of a configuration of an optical transmission control apparatus will be described hereinafter with reference to FIG. 1.

FIG. 1 is a block diagram showing an example of an optical transmission control apparatus according to the present disclosure.

As shown in FIG. 1, an optical transmission control apparatus 13 according to the present disclosure includes a selecting unit 131, a specifying unit 132, a control unit 133, and a path-direction switching unit 134.

The selecting unit 131 selects a saturated optical transmission path 14*s* of which the optical transmission usage ratio exceeds a first threshold from among a plurality of optical transmission paths 14 connected between the first and second optical transmission apparatuses 11 and 12. The plurality of optical transmission paths 14 are formed by first to nth optical transmission paths 141 to 14*n*. The nth optical transmission path 14*n* is formed by an nth downlink optical transmission path 14*nd* and an nth uplink optical transmission path 14*nu*. Note that n is an integer equal to or greater than one. Further, the saturated optical transmission path 14*s* is, for example, a first downlink optical transmission path 141*d*. Note that the optical transmission usage ratio may also be referred to as a filling ratio. Further, the filling ratio is the ratio of the currently-used wavelength band to the maximum wavelength band in which optical signals can be transmitted through the optical transmission path.

The specifying unit 132 specifies an evacuation optical transmission path 14*e* of which the optical transmission direction is opposite to that of the saturated optical transmission path 14*s* and of which the optical transmission usage ratio is lower than a second threshold from among the plurality of optical transmission paths 14. The reason why the evacuation optical transmission path 14*e* is specified from among optical transmission lines of which the optical transmission directions are opposite to that of the saturated optical transmission path 14*s* is that the purpose of the evacuation is, when there is an imbalance between the amount of data to be transmitted in the uplink and that in the downlink, to change the transmission capacities of the uplink and downlink by switching the transmission direction of at least one of the optical transmission paths. Further, in this case, it is possible to increase the amount of data evacuated (i.e., transferred) to the evacuation optical transmission path 14*e* by specifying, as the evacuation optical transmission path 14*e*, an optical transmission path of which the optical transmission usage ratio is lower than the second threshold, i.e., of which the usage ratio is low. Here, it is assumed that, for example, the nth uplink optical transmission path 14*nu* is specified as the evacuation optical transmission path 14*e*. Note that the second threshold is lower than the first threshold.

The control unit 133 transmits, to the first and second optical transmission apparatuses 11 and 12, a transfer control signal for transferring data to be transmitted through a counterpart optical transmission path 14*p*, which is an optical transmission path which is paired with the saturated optical transmission path 14*s* and of which the optical transmission direction is opposite to that of the saturated optical transmission path 14*s*, to the evacuation optical transmission path 14*e*. Since the saturated optical transmission path 14*s* is the first downlink optical transmission path 141*d*, the counterpart optical transmission path 14*p*, which is paired with the saturated optical transmission path 14*s*, is the first uplink optical transmission path 141*u*. As the control unit 133 transmits the transfer control signal to the first and second optical transmission apparatuses 11 and 12, the first and second optical transmission apparatuses 11 and 12 operate so as to transfer data to be transmitted through the first uplink optical transmission path 141*u* (counterpart optical transmission path 14*p*) to the nth uplink optical transmission path 14*nu* (evacuation optical transmission path 14*e*).

The path-direction switching unit 134 transmits, to the first and second optical transmission apparatuses 11 and 12, a switching control signal for switching the optical transmission direction of the counterpart optical transmission path 14*p* to the opposite direction after the transfer of the data to be transmitted through the counterpart optical transmission path 14*p* to the evacuation optical transmission path 14*e* is completed. As the path-direction switching unit 134 transmits the switching control signal to the first and second optical transmission apparatuses 11 and 12, the first and second optical transmission apparatuses 11 and 12 operate so as to switch the optical transmission direction of the counterpart optical transmission path 14*p* to the opposite direction.

The control unit 133 transmits, to the first and second optical transmission apparatuses 11 and 12, a sorting-out control signal for sorting out part of the data to be transmitted through the saturated optical transmission path 14*s* to the counterpart optical transmission path 14*p* after the optical transmission direction of the counterpart optical transmission path 14*p* is switched to the opposite direction.

<Effect>

In this way, even when an imbalance occurs between the amounts of data to be transmitted, it is possible to switch the optical transmission direction, and thereby to flexibly change the transmission capacities of the uplink and downlink, thus making it possible to transmit data without laying (e.g., installing) a new optical transmission path. As a result, it is possible to provide an optical transmission control apparatus, a method for an optical transmission control apparatus, and a program capable of changing the transmission capacities of optical transmission lines based on the amounts of data to be transmitted therethrough.

Further, according to the first example embodiment, since a counterpart optical transmission path, which is paired with a saturated optical transmission path, is used, the saturated optical transmission path and the counterpart optical transmission path are the same path. As a result, since the saturated optical transmission path and the counterpart optical transmission path extend (i.e., are routed) through the same environment and have the same transmission distance, their delay characteristics and the like are equivalent to each other, so that signals transmitted through these optical transmission paths can be easily received on the receiving side (e.g., there is no need to separately make delay compensation or the like in the saturated optical transmission path and the counterpart optical transmission path).

<Configuration of Optical Transmission System>

An example of a configuration of an optical transmission system will be described hereinafter with reference to FIG. 2.

Figure 2:
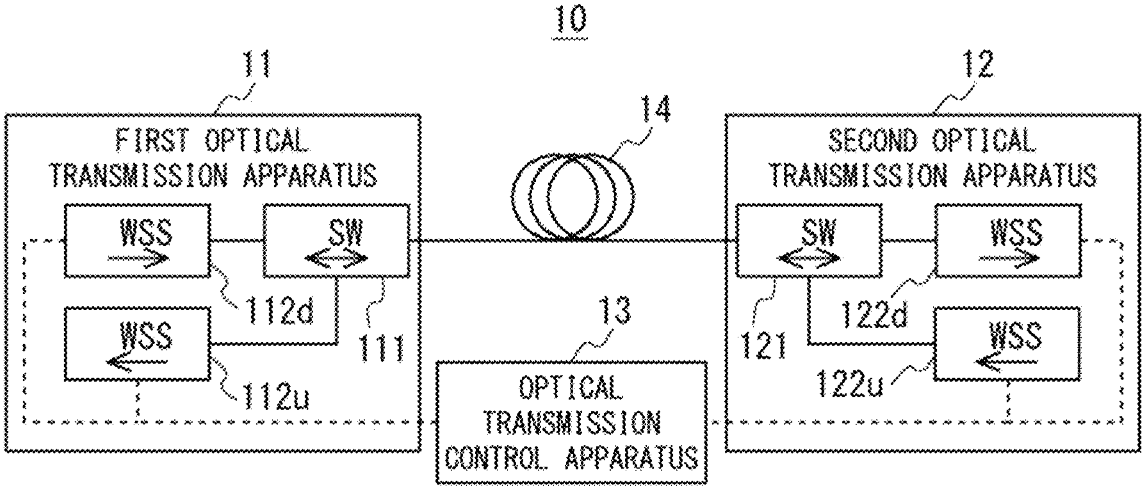
FIG. 2 is a block diagram showing an example of an optical transmission system according to the present disclosure.

FIG. 2 is a block diagram showing an example of an optical transmission system according to the present disclosure.

Figure 3:
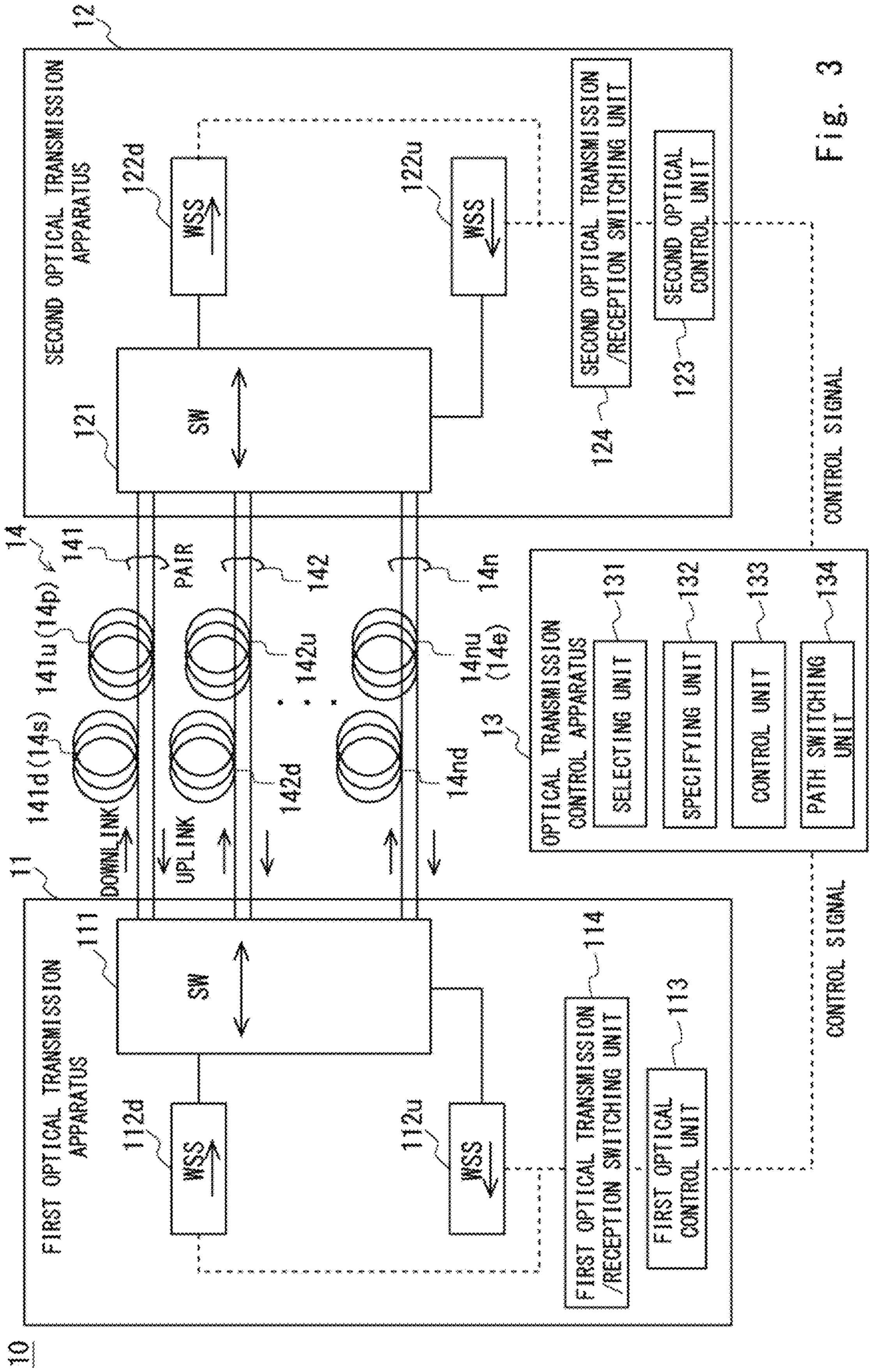
FIG. 3 is a detailed block diagram showing an example of an optical transmission system according to the present disclosure.

In FIG. 2, the first optical transmission/reception switching unit and the first optical control unit of the first optical transmission apparatus shown in FIG. 3 are omitted for the sake of simplicity, and the second optical transmission/reception switching unit and the second optical control unit of the second optical transmission apparatus are also omitted for the sake of simplicity.

FIG. 3 is a detailed block diagram showing an example of an optical transmission system according to the present disclosure.

There are actually a plurality of optical switching units (SWs) for respective fiber pairs in each optical transmission apparatus as described in FIG. 12 (which will be described later), but for the sake of simplicity, they are collectively shown as one SW in FIG. 3. The same applies to the wavelength selecting switching units (WSSs) shown in FIG. 3.

As shown in FIGS. 2 and 3, an optical transmission system 10 according to the present disclosure includes a first optical transmission apparatus 11, a second optical transmission apparatus 12, a plurality of optical transmission paths 14 each of which is connected between the first and second optical transmission apparatuses 11 and 12, and an optical transmission control apparatus 13 that controls the first and second optical transmission apparatuses 11 and 12.

The plurality of optical transmission paths 14 include at least a first optical transmission path 141 and a second optical transmission path 142. In the first optical transmission path 141, a first downlink optical transmission path 141*d*, through which signals are transmitted from the first optical transmission apparatus 11 toward the second optical transmission apparatus 12, is paired with a first uplink optical transmission path 141_u_, through which signals are transmitted from the second optical transmission apparatus 12 toward the first optical transmission apparatus 11. In the second optical transmission path 142, a second downlink optical transmission path 142_d_, through which signals are transmitted from the first optical transmission apparatus 11 toward the second optical transmission apparatus 12, is paired with a second uplink optical transmission path 142_u_, through which signals are transmitted from the second optical transmission apparatus 12 toward the first optical transmission apparatus 11.

The first optical transmission apparatus 11 includes a first optical switching unit 111, a first downlink wavelength selecting switching unit 112_d_, a first uplink wavelength selecting switching unit 112_u_, a first optical control unit 113, and a first optical transmission/reception switching unit 114. The first optical switching unit 111 is represented by SW, which is an abbreviation of an optical switch (Switch). The wavelength selecting switching unit is represented by WSS, which is an abbreviation of a wavelength selective switch (Wavelength Selective Switch).

The first optical control unit 113 controls the first optical switching unit 111 and the first downlink wavelength selecting switching unit 112_d_ or the first uplink wavelength selecting switching unit 112_u_ based on a transfer control signal in order to transfer data to be transmitted through a counterpart optical transmission path 14_p_ so that the data is transmitted through an evacuation optical transmission path 14_e_.

The first optical transmission/reception switching unit 114 controls the first optical switching unit 111 and the first downlink wavelength selecting switching unit 112_d_ or the first uplink wavelength selecting switching unit 112_u_ in order to switch the optical transmission direction of the counterpart optical transmission path 14_p_ to the opposite direction based on a switching control signal after the transfer of the data to be transmitted through the counterpart optical transmission path 14_p_ is completed.

The first optical control unit 113 sorts out part of the data to be transmitted through the saturated optical transmission path 14_s_ to the counterpart optical transmission path 14_p_ based on a sorting-out control signal after the optical transmission direction of the counterpart optical transmission path 14_p_ is switched to the opposite direction. The transfer control signal, the switching control signal, and the sorting-out control signal are collectively referred to as control signals.

The second optical transmission apparatus 12 includes a second optical switching unit 121, a second downlink wavelength selecting switching unit 122_d_, a second uplink wavelength selecting switching unit 122_u_, a second optical control unit 123, and a second optical transmission/reception switching unit 124.

The second optical control unit 123 controls the second optical switching unit 121 and the second downlink wavelength selecting switching unit 122_d_ or the second uplink wavelength selecting switching unit 122_u_ based on the transfer control signal in order to transfer data to be transmitted through the counterpart optical transmission path 14_p_ so that the data is transmitted through the evacuation optical transmission path 14_e_.

The second optical transmission/reception switching unit 124 controls the second optical switching unit 121 and the second downlink wavelength selecting switching unit 122_d_ or the second uplink wavelength selecting switching unit 122_u_ in order to switch the optical transmission direction of the counterpart optical transmission path 14_p_ to the opposite direction based on the switching control signal after the transfer of the data to be transmitted through the counterpart optical transmission path 14_p_ is completed. Each of the second downlink and uplink wavelength selecting switching units 122_d_ and 122_u_ may be a wavelength selective switch (WSS: Wavelength Selective Switch).

The second optical control unit 123 sorts out part of the data to be transmitted through the saturated optical transmission path 14_s_ to the counterpart optical transmission path 14_p_ based on the sorting-out control signal after the optical transmission direction of the counterpart optical transmission path 14_p_ is switched to the opposite direction.

Note that an optical transmission apparatus may also be referred to as a node or a Node. Further, the optical transmission control apparatus 13 has already been described above and hence the description thereof will be omitted here.

Further, the first optical transmission apparatus 11 may further include a wavelength conversion unit (not shown). When the evacuation optical wavelength of the optical carrier wave for conveying data to be transmitted through the evacuation optical transmission path 14_e_ and the counterpart optical wavelength of the optical carrier wave for conveying data to be transmitted through the counterpart optical transmission path 14_p_ are the same as each other, they may interfere with each other. Therefore, the wavelength conversion unit converts the counterpart optical wavelength into a wavelength different from the evacuation optical wavelength in order to avoid such interference.

<Operation of Optical Transmission Control Apparatus>

An example of operations performed by the optical transmission control apparatus will be described hereinafter with reference to FIG. 4.

Figure 4:
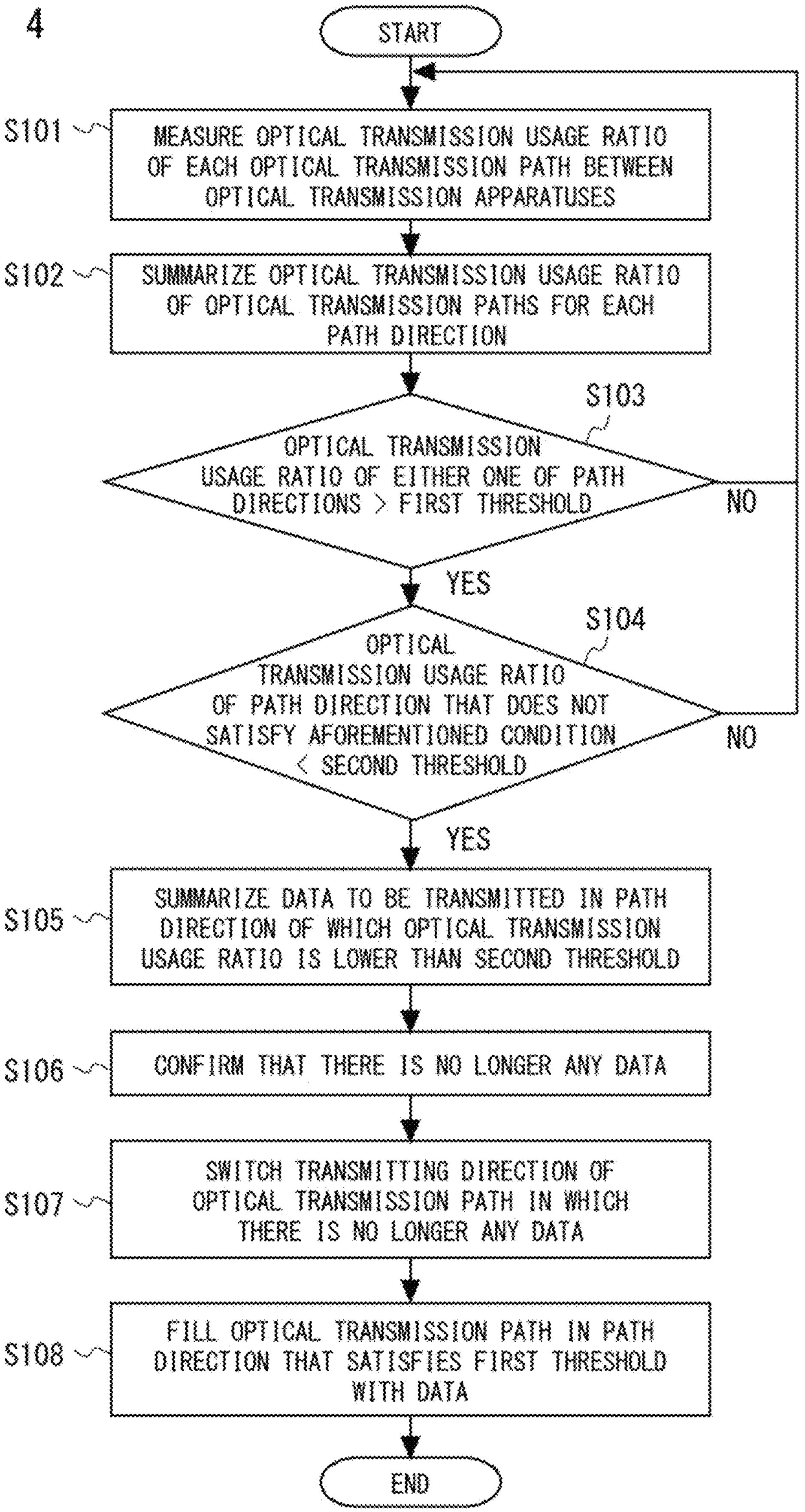
FIG. 4 is a flowchart showing an example of operations performed by a control apparatus according to the present disclosure.

FIG. 4 is a flowchart showing an example of operations performed by a control apparatus according to the present disclosure.

As shown in FIG. 4, the optical transmission control apparatus 13 measures an optical transmission usage ratio of each optical transmission path between optical transmission apparatuses (Step S101). The optical transmission usage ratio may also be referred to as a filling ratio or a usage ratio.

The optical transmission control apparatus 13 summarizes optical transmission usage ratios of optical transmission paths for each path direction (e.g., for each of the downlink and the uplink) (Step S102).

The optical transmission control apparatus 13 checks whether the optical transmission usage ratio for either of the path directions (e.g., either of the downlink and the uplink) exceeds a first threshold (Step S103). That is, the optical transmission control apparatus 13 selects an optical transmission path (saturated optical transmission path 14_s_) of which the optical transmission usage ratio exceeds the first threshold from among a plurality of optical transmission paths 14.

When Step S103: Yes, the optical transmission control apparatus 13 checks whether the optical transmission usage ratio of the path direction that does not satisfy the condition in the step S103 is lower than a second threshold (Step S104). Specifically, the optical transmission control apparatus 13 specifies an optical transmission path (evacuation optical transmission path 14_e_) of which the optical transmission direction is opposite to that of the saturated optical transmission path 14_s_ and of which the optical transmission usage ratio is lower than the second threshold from among the plurality of optical transmission paths 14. When Step S103: No, the optical transmission control apparatus 13 returns to the step S101.

When Step S104: Yes, the optical transmission control apparatus 13 summarizes (e.g., adds up) amounts of data to be transmitted in the path direction (evacuation optical transmission path 14*e*) of which the optical transmission usage ratio is lower than the second threshold (Step S105). Specifically, the optical transmission control apparatus 13 controls the first and second optical transmission apparatuses 11 and 12 so as to transfer data to be transmitted through the counterpart optical transmission path 14*p*, which is paired with the saturated optical transmission path 14*s* and of which the optical transmission direction is opposite to that of the saturated optical transmission path, to the evacuation optical transmission path 14*e*. When Step S104 is No, the optical transmission control apparatus 13 returns to the step S101. Data to be transmitted may also be referred to as traffic.

In the step S105, if the optical wavelengths overlap in the evacuation optical transmission path 14*e* when data (traffic) to be transmitted in the path direction of which the optical transmission usage ratio is lower than the second threshold is summarized (e.g., added up), the optical wavelength to be transferred is temporarily dropped, and then is converted and added again. As a result, the optical wavelength that is already present in the evacuation optical transmission path 14*e* and the optical wavelength to be transferred are no longer the same as each other, thus making it possible to avoid the interference therebetween.

The optical transmission control apparatus 13 confirms that there is no longer data to be transmitted (Step S106). Specifically, the optical transmission control apparatus 13 confirms that the transfer of data to be transmitted through the counterpart optical transmission path 14*p* has been completed, and that there is no longer data to be transmitted through the counterpart optical transmission path 14*p*.

The optical transmission control apparatus 13 switches the transmission direction of the optical transmission path (counterpart optical transmission path 14*p*) in which there is no longer data to be transmitted (Step S107). Specifically, the optical transmission control apparatus 13 switches the optical transmission direction of the counterpart optical transmission path 14*p* in which there is no longer data to be transmitted to the opposite direction.

The optical transmission control apparatus 13 fills (i.e., supplies) the optical transmission pass in the path direction that satisfies the first threshold (i.e., the saturated optical transmission path 14*s*) with data (Step S108). Specifically, the optical transmission control apparatus 13 controls the first and second optical transmission apparatuses 11 and 12 so as to sort out part of the data to be transmitted through the saturated optical transmission path 14*s* to the counterpart optical transmission path 14*p*. As a result, the counterpart optical transmission path 14*p* is filled (i.e., supplied) with data to be transmitted through the saturated optical transmission path 14*s*.

<Effect>

The optical transmission usage ratio of data transmitted through the saturated optical transmission path 14*s* is reduced, so that the data to be transmitted can be transmitted, thus eliminating the need to lay (i.e., install) a new optical transmission path. As a result, it is possible to provide an optical transmission control apparatus, a method for an optical transmission control apparatus, and a program capable of changing the transmission capacities of optical transmission lines based on the amounts of data to be transmitted therethrough.

Modified Example 1

Figure 5:
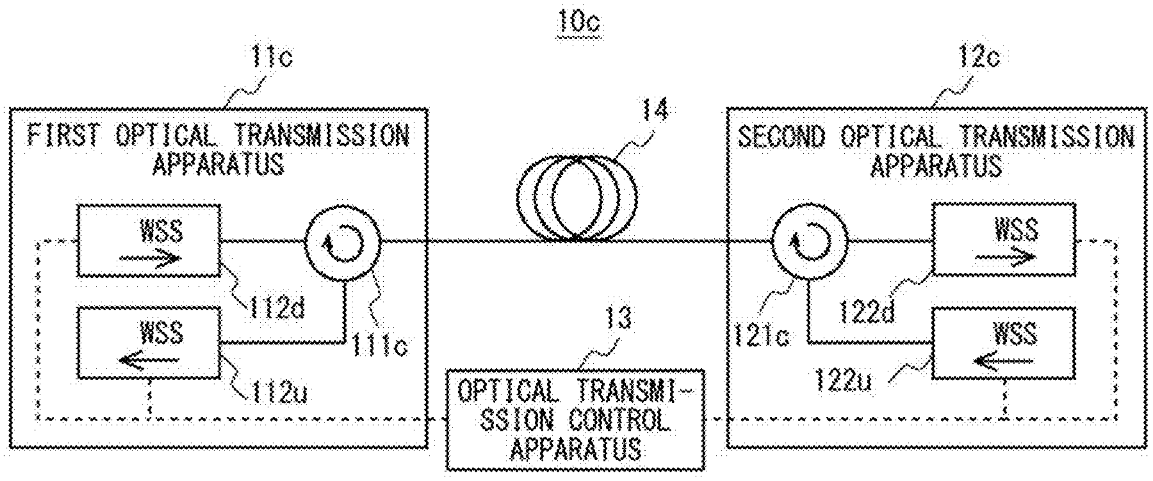
FIG. 5 is a block diagram showing an example of an optical transmission system according to the present disclosure.

FIG. 5 is a block diagram showing an example of an optical transmission system according to the present disclosure.

As shown in FIG. 5, a first optical transmission apparatus 11*c* according to Modified Example 1 of the first example embodiment differs from the first optical transmission apparatus 11 according to the first example embodiment (see FIG. 2) in that an optical circulator 111*c* is used instead of the optical switch as the first optical switching unit 111. Similarly, a second optical transmission apparatus 12*c* is different from the second optical transmission apparatus 12 in that an optical circulator 121*c* is used instead of the optical switch as the second optical switching unit 121.

The optical circulator is a directional optical device and can be used in place of an optical switch. That is, each of the first and second optical switching units 111 and 121 may be an optical switch or an optical circulator.

Modified Example 2

Figure 6:
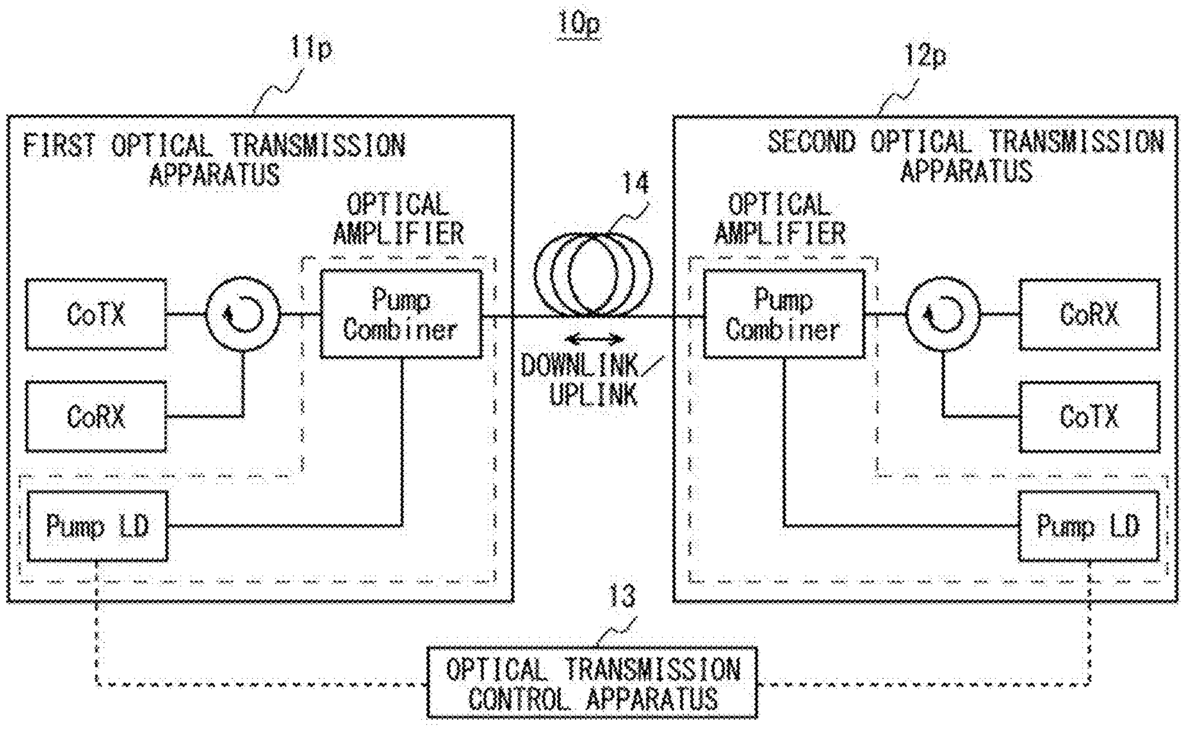
FIG. 6 is a block diagram showing an example of an optical transmission system according to the present disclosure.

FIG. 6 is a block diagram showing an example of an optical transmission system according to the present disclosure.

As shown in FIG. 6, a first optical transmission apparatus 11*p* according to Modified Example 2 of the first example embodiment includes a CoTX (Coherent Transmitter), a CoRX (Coherent Receiver), an optical circulator, and an optical amplifier. The optical amplifier includes a Pump Combiner and a Pump LD (Laser Diode) connected thereto.

The Pump LD is used as exciting light when the optical amplifier operates. The Pump Combiner amplifies downlink data by using downlink data coming from the CoTX and exciting light excited by the Pump LD. The first optical transmission apparatus 11*p* may further includes a plurality of optical amplifiers each of which amplifies data to be transmitted through a respective one of a plurality of optical transmission paths. Further, the Pump Combiner amplifies uplink data by combining uplink data coming from the optical transmission path and the exciting light excited by the Pump LD.

The first optical transmission apparatus 11*p* and the second optical transmission apparatus 12 amplify the downlink data and the uplink data by using the Pump Combiner and the Pump LD. In this way, it is possible to transmit data over a longer distance than when no optical amplifier is used.

<Method for Switching Optical Transmission Direction>

Figure 7A:
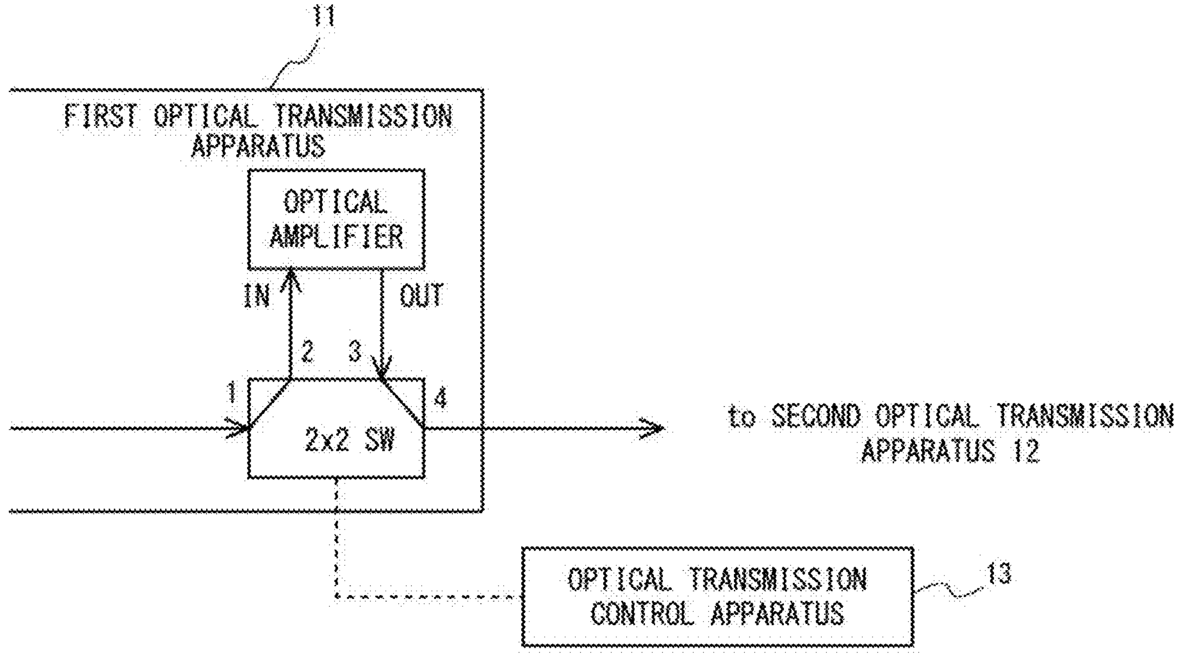
FIG. 7A is a block diagram showing an example of an optical amplifier part in FIG. 6.

FIG. 7A is a block diagram showing an example of a part of the optical amplifier shown in FIG. 6.

FIG. 7A shows an optical transmission path before the optical transmission direction is switched.

Figure 7B:
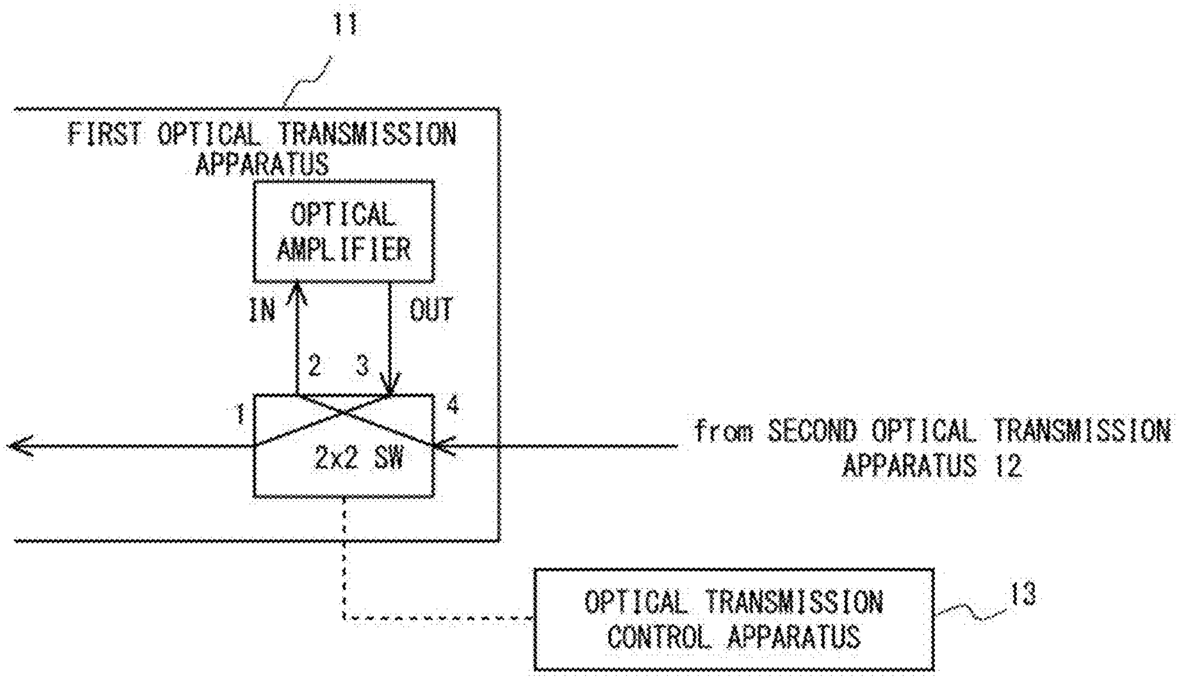
FIG. 7B is a block diagram showing an example of an optical amplifier part in FIG. 6.

FIG. 7B is a block diagram showing an example of the part of the optical amplifier shown in FIG. 6.

FIG. 7B shows an optical transmission path after the optical transmission direction is switched.

When an optical module amplifier such as an EDFA (Erbium Doped Fiber Amplifier) is used as the optical amplifier, it is necessary to provide a 2×2 optical switch in the input/output unit and control the 2×2 optical switch so that the input direction of the optical amplifier is kept in the forward direction (the direction in which signals are input from the IN terminal and output from the OUT terminal) even when the path direction is switched. The optical amplifier includes the IN terminal and the OUT terminal, and data is always input from the IN terminal and output from the OUT terminal. That is, the reverse connection is not allowed. Therefore, it is necessary to maintain the IN-OUT relationship of the optical amplifier by using a switch or the like even when the optical transmission direction is switched. This relationship for the IN-OUT direction is referred to as the forward direction.

A specific method for maintaining the input direction of the optical amplifier in the forward direction even when the path direction is switched is shown hereinafter.

As shown in FIG. 7A, the optical transmission path before the switching is a path of "First terminal of 2×2 optical switch→Second terminal→IN terminal of optical amplifier→OUT terminal→Third terminal of 2×2 optical switch→Fourth terminal→Second optical transmission apparatus 12". Meanwhile, as shown in FIG. 7B, the optical transmission path after the switching is a path of "Second optical transmission apparatus 12→Fourth terminal of 2×2 optical switch→Second terminal→IN terminal of optical amplifier→OUT terminal→Third terminal of 2×2 optical switch→First terminal".

By controlling the connection terminals of the 2×2 optical switch as shown in FIGS. 7A and 7B before and after the switching of the optical transmission direction, it is possible to switch the optical transmission direction without replacing the IN terminal and the OUT terminal of the optical amplifier with each other.

Modified Example 3

Figure 8A:
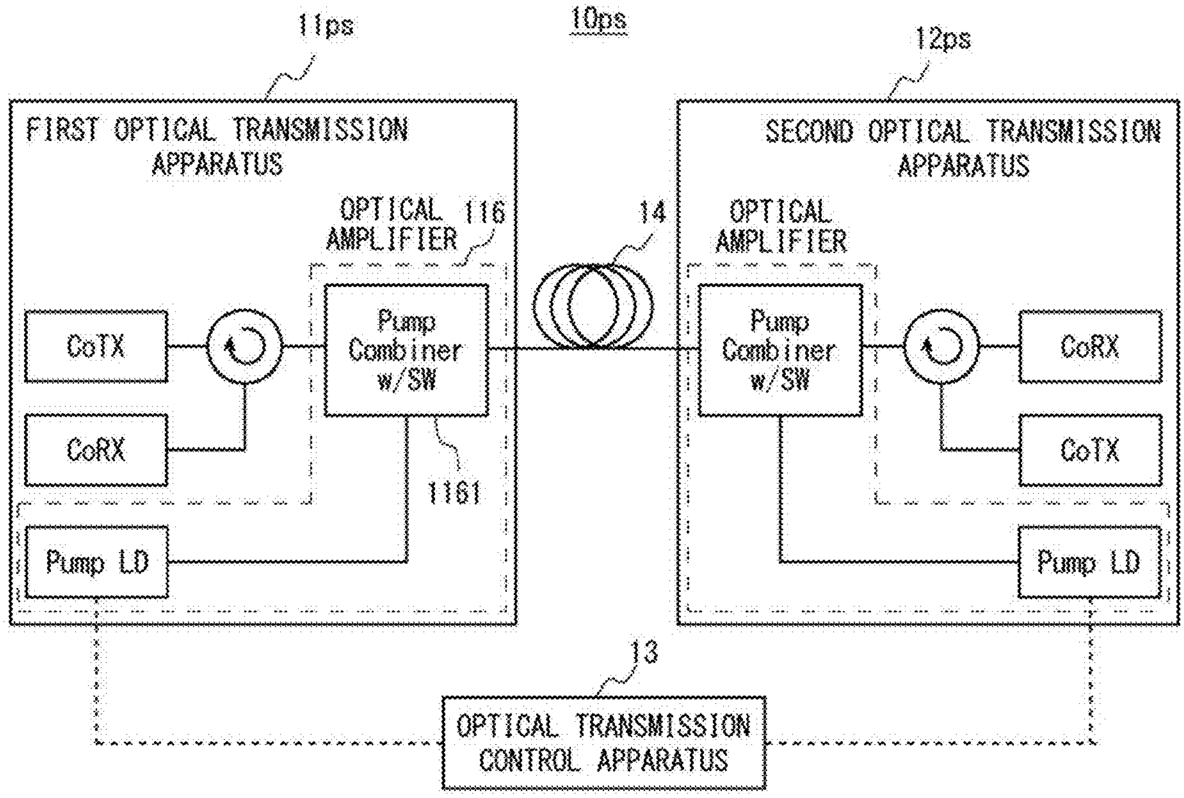
FIG. 8A is a block diagram showing an example of an optical transmission system according to the present disclosure.

FIG. 8A is a block diagram showing an example of an optical transmission system according to the present disclosure.

Figure 8B:
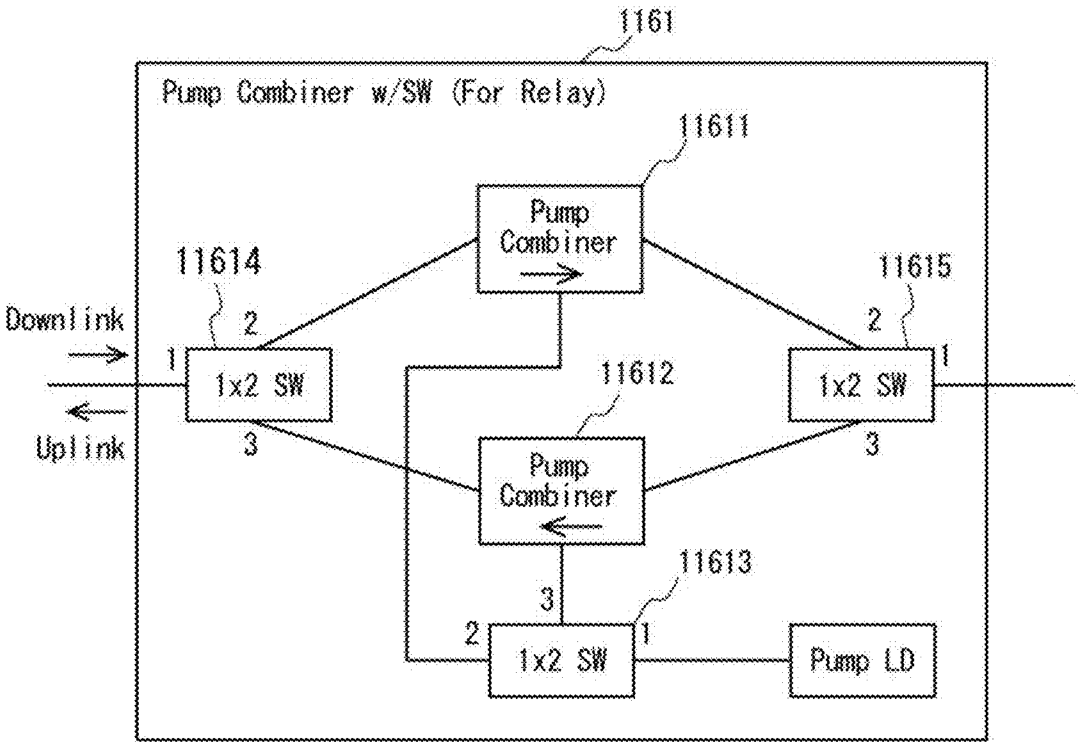
FIG. 8B is a block diagram showing an example of a Pump Combiner s/SW unit according to the present disclosure.

FIG. 8B is a block diagram showing an example of a Pump Combiner s/SW unit according to the present disclosure.

As shown in FIG. 8A, a first optical transmission apparatus 11*ps* according to Modified Example 3 of the first example embodiment differs from the first optical transmission apparatus 11*p* according to Modified Example 2 of the first example embodiment (see FIG. 6) in that a Pump Combiner w/SW, which is a combination of a Pump Combiner and a 1×2 optical switch, is provided in place of the Pump Combiner.

As shown in FIG. 8B, the optical transmission path before the switching is a path of "First terminal of 1×2 optical switch 11614→Second terminal→Pump Combiner 11611→Second terminal of 1×2 optical switch 11615→First terminal". Note that the exiting light of the Pump LD enters the Pump Combiner 11611 through a path of "First terminal of 1×2 optical switch 11613→Second terminal→Pump Combiner 11611".

Meanwhile, the optical transmission path after the switching is a path of "First terminal of 1×2 optical switch 11615→Third terminal→Pump Combiner 11612→Third terminal of 1×2 optical switch 11614→First terminal". Note that the exiting light of the Pump LD enters the Pump Combiner 11612 through a path of "First terminal of 1×2 optical switch 11613→Third terminal→Pump Combiner 11612".

By controlling the connection terminals of the 1×2 optical switch as shown in FIG. 8B before and after the switching of the optical transmission direction, it is possible to switch the optical transmission direction by using the Pump Combiner s/SW 1161.

Second Example Embodiment

<Configuration 1 of ROADM>

Figure 9:
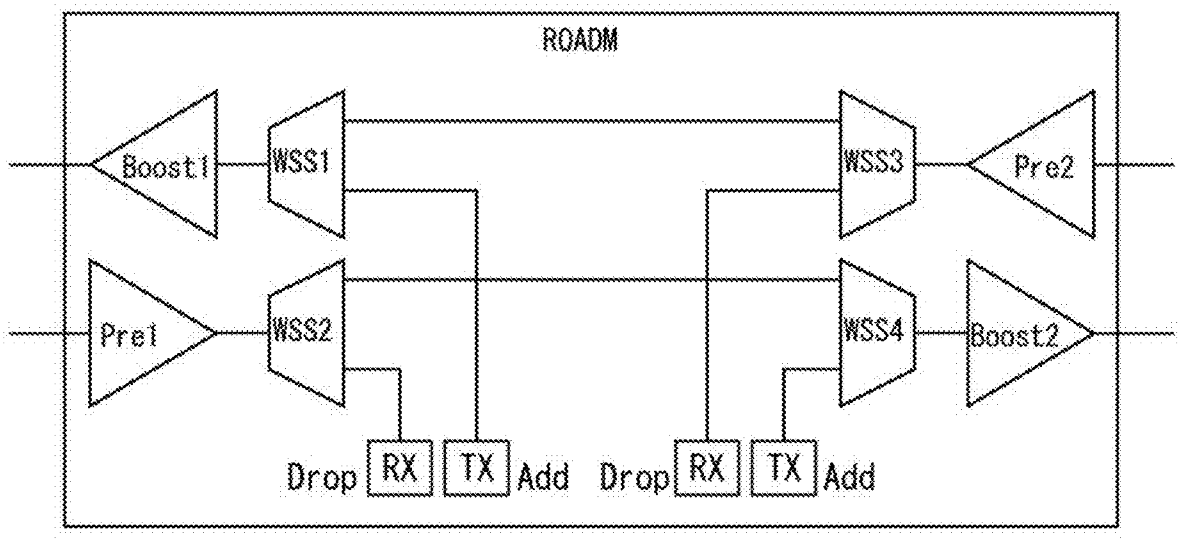
FIG. 9 is a block diagram showing an example of a ROADM according to the present disclosure.

FIG. 9 is a block diagram showing an example of a ROADM according to the present disclosure.

FIG. 9 is a block diagram showing an example of an ordinary two-way ROADM. That is, FIG. 9 is a block diagram showing an example of a ROADM of one pair composed of downlink and uplink fibers (optical transmission path). The optical transmission path is, for example, optical fibers. The optical fibers may also be referred to as fibers.

In the first example embodiment, the description of the configuration for branching/inserting an optical signal from/to an optical transmission apparatus has been omitted in order to place emphasis on the features of the present disclosure. In the second example embodiment, a case where a technology according to the present disclosure is applied to a ROADM (Reconfigurable Optical Add/Drop Multiplexer), which is an example of an actual optical transmission apparatus, will be described. The ROADM may also be referred to as a Node or a node. Therefore, each of the first and second optical transmission apparatuses 11 and 12 may be formed by a ROADM apparatus.

As shown in FIG. 9, a ROADM is an apparatus capable of branching/inserting an optical signal, and includes WSSs, Boosts, and Pres. Each of the WSSs is a wavelength selective switch; each of the Boosts is a transmitting amplifier; and each of the Pres is a receiving amplifier. A TX Add is an input unit through which data is input from the outside, and an RX Drop is an output unit through which data is output to the outside.

An optical signal (data) input to the Pre 2 is transmitted to the WSS 1 based on the wavelength selection of the WSS 3, and output to the outside through the Boost 1 based on the wavelength selection of the WSS 1.

An optical signal (data) input to the Pre 1 is transmitted to the WSS 4 based on the wavelength selection of the WSS 2, and output to the outside through the Boost 2 based on the wavelength selection of the WSS 4.

<Configuration 2 of ROADM>

Figure 10:
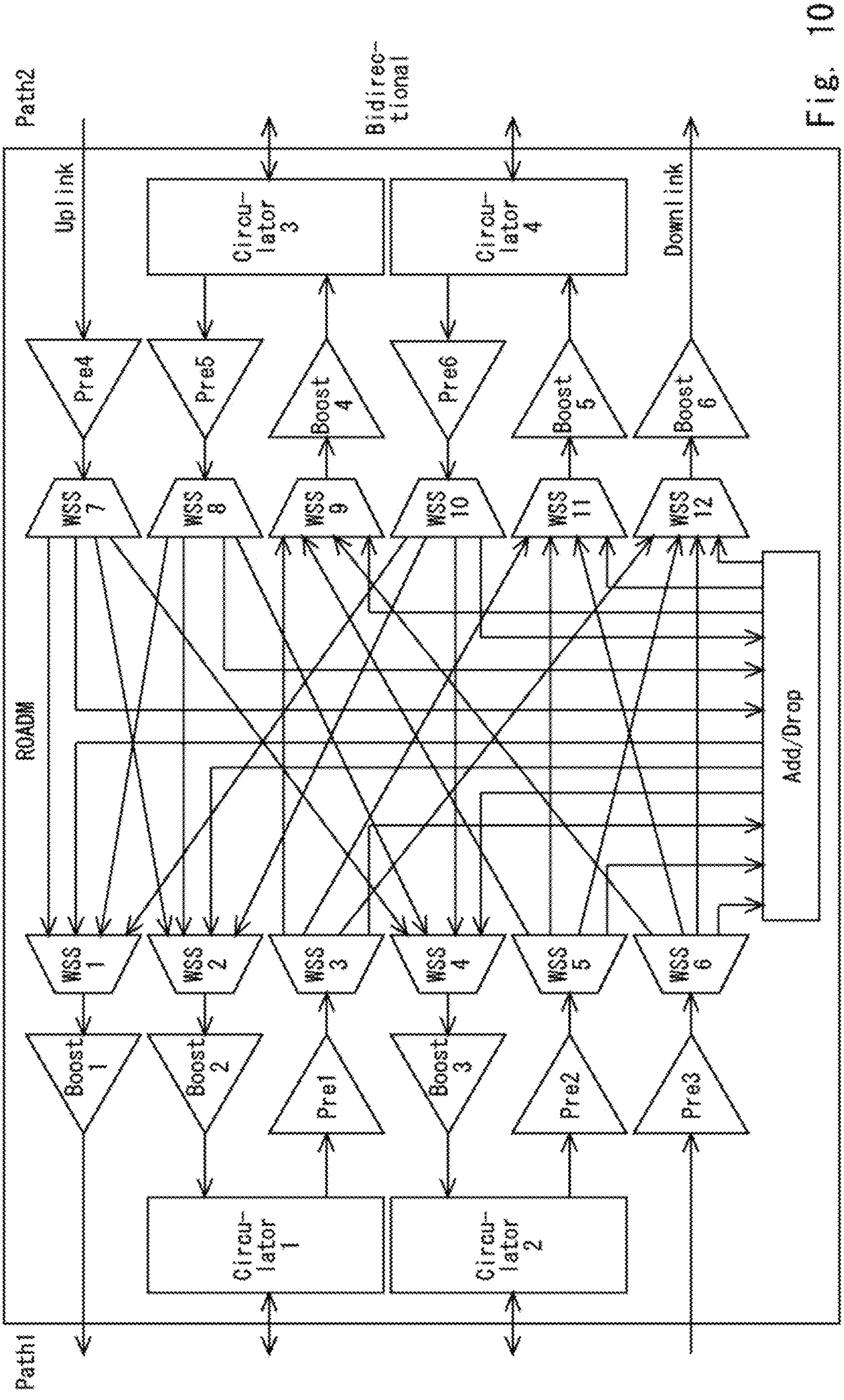
FIG. 10 is a block diagram showing an example of a ROADM according to the present disclosure.

FIG. 10 is a block diagram showing an example of a ROADM according to the present disclosure.

FIG. 10 is a block diagram showing an example of a ROADM for processing one downlink fiber, one uplink fiber, and two bidirectional fibers.

As shown in FIG. 10, an uplink optical signal input to the Pre 4 is transmitted in a direction indicated by an arrow shown in FIG. 10. For example, an uplink optical signal input to the Pre 4 is amplified in the Pre 4, transmitted to the WSS 1 based on the wavelength selection of the WSS 7, amplified in the Boost 1 based on the wavelength selection of the WSS 1, and then output to the outside. Further, for example, a downlink optical signal input to the Pre 3 is amplified in the Pre 3, transmitted to the WSS 9 based on the wavelength selection of the WSS 6, amplified in the Boost 4 based on the wavelength selection of the WSS 9, and then output to the outside through a Circulator 3.

<Configuration of Network Using Node (ROADM)>

Figure 11:
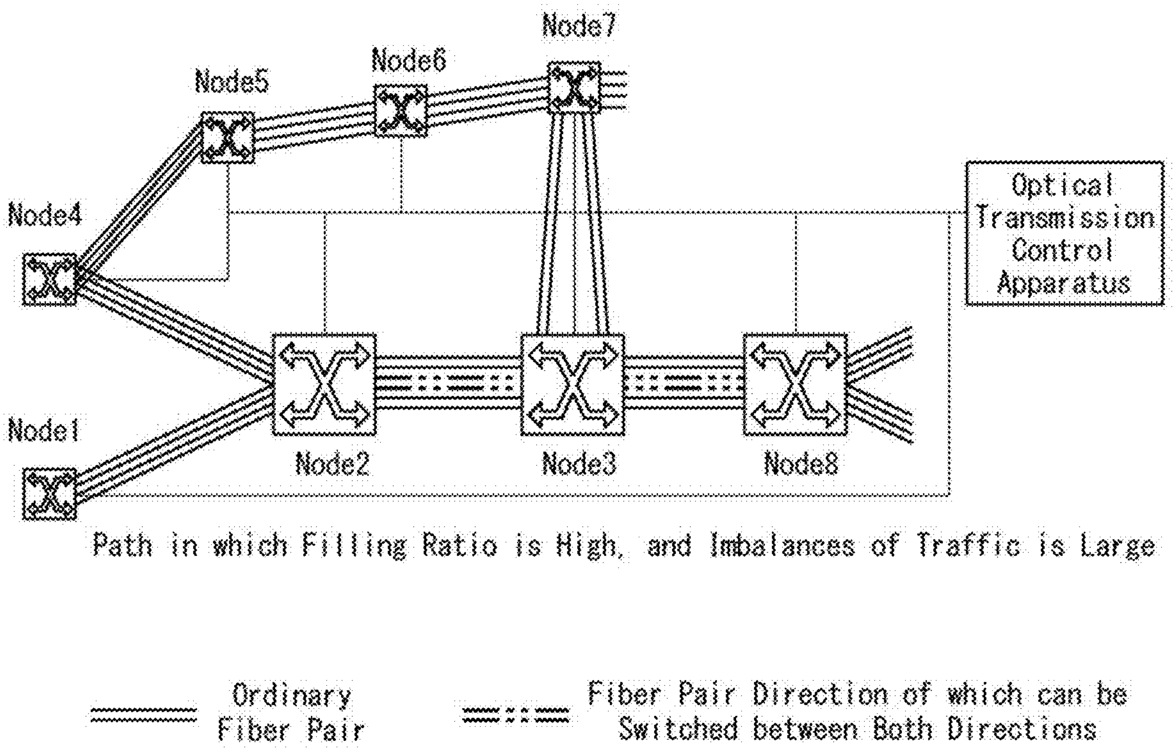
FIG. 11 is a block diagram showing an example of a network using Nodes according to the present disclosure.

FIG. 11 is a block diagram showing an example of a network using Nodes according to the present disclosure.

As shown in FIG. 11, the network is formed by Nodes 1 to 8 in this example. This example is merely an example and the present disclosure is not limited to this example. The Node 2 is connected to the Nodes 1, 3 and 4, and Node 3 is connected to the Nodes 2, 7 and 8. Note that in fibers connected between the Nodes 2 and 3, there are, in addition to ordinary fiber pairs, fiber pairs the directions of which can be switched. Further, it is assumed that fibers connected between the Nodes 2 and 8, there are also, in addition to ordinary fiber pairs, fiber pairs the directions of which can be switched. The following description will be given under these conditions.

<Operation of Node >

Figure 12:
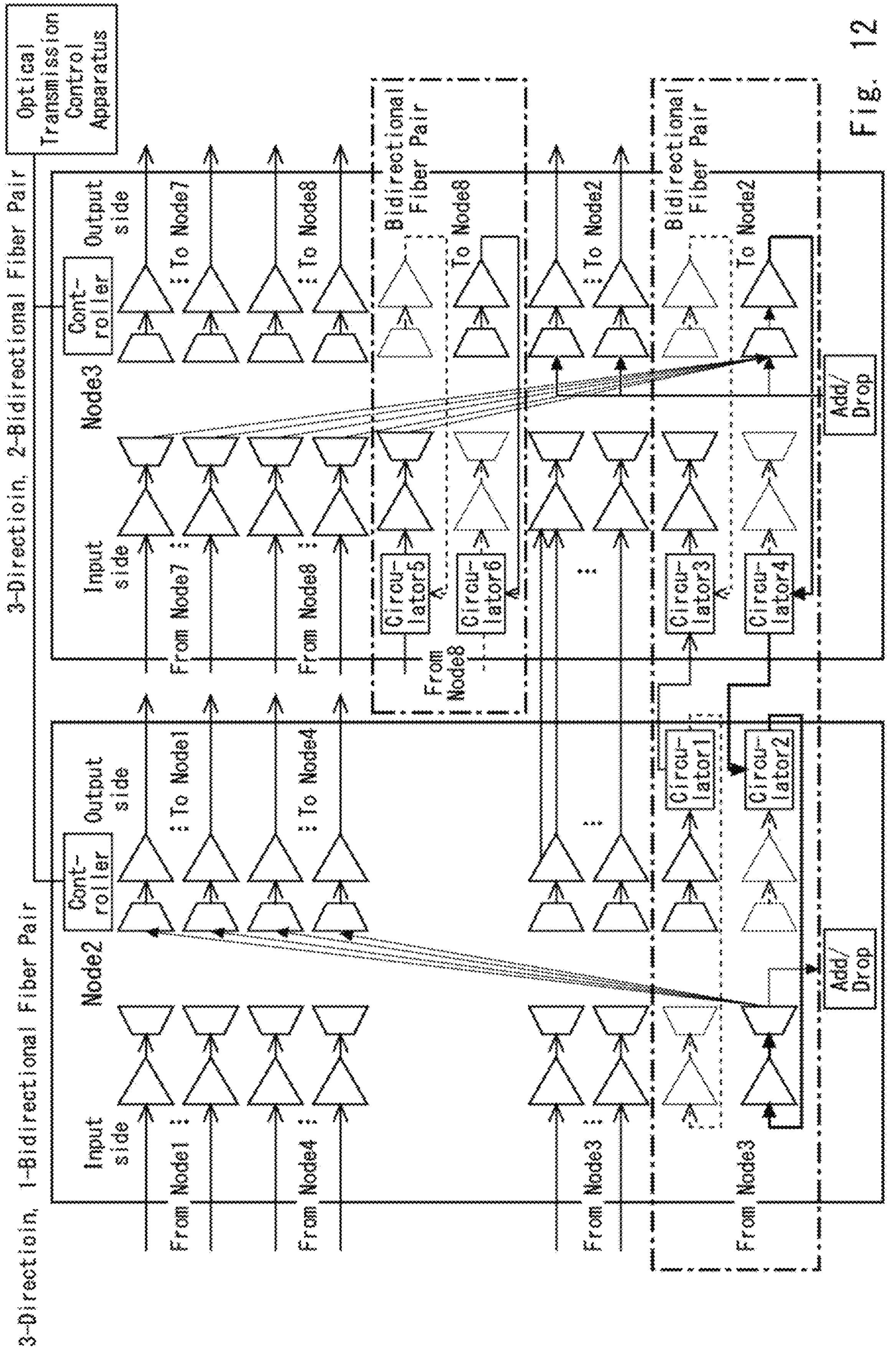
FIG. 12 is a block diagram showing an example of Nodes 2 and 3 according to the present disclosure.

FIG. 12 is a block diagram showing an example of Nodes 2 and 3 according to the present disclosure.

Figure 13:
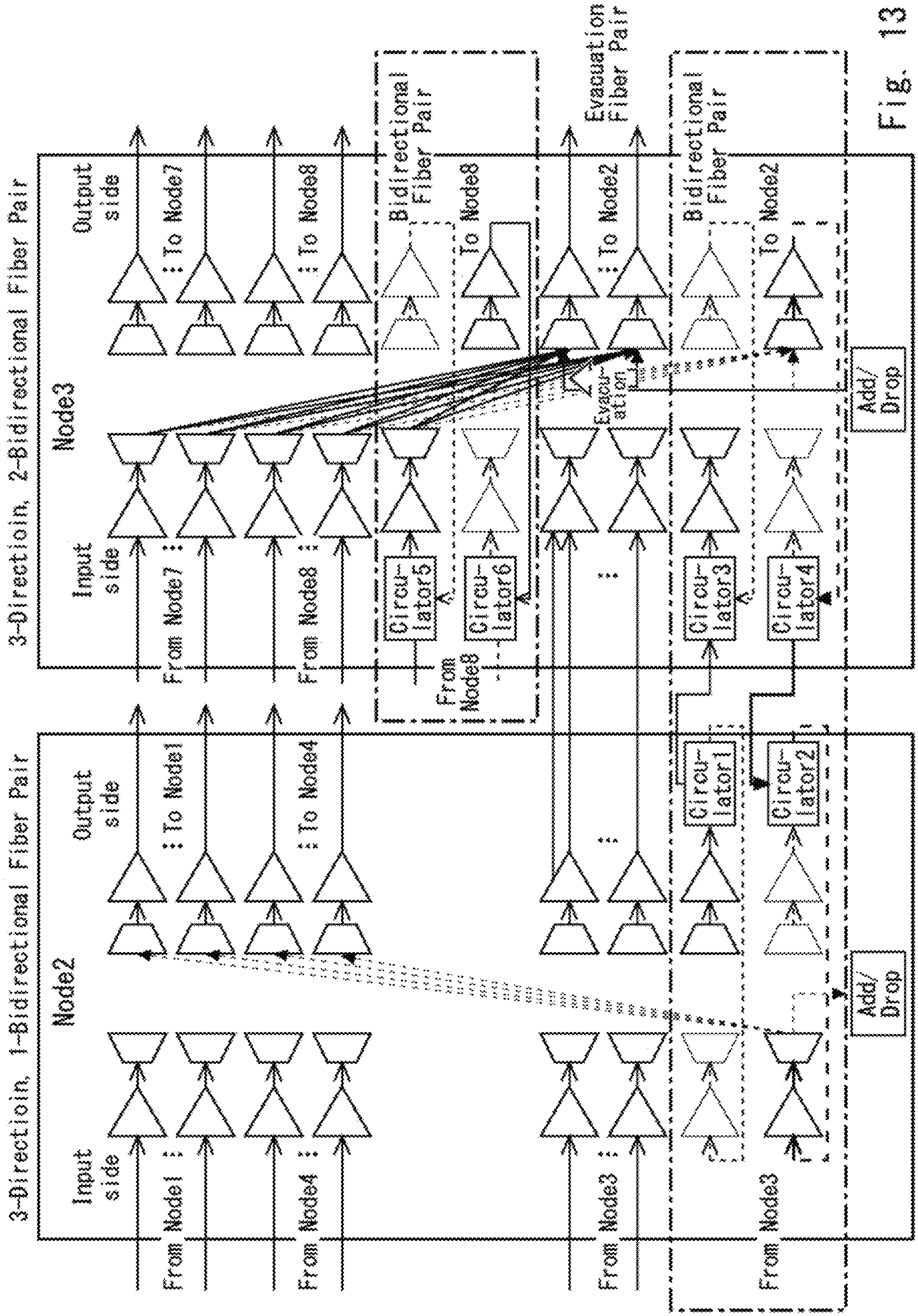
FIG. 13 is a block diagram showing an example of Nodes 2 and 3 according to the present disclosure.

FIG. 13 is also a block diagram showing an example of Nodes 2 and 3 according to the present disclosure.

Figure 14:
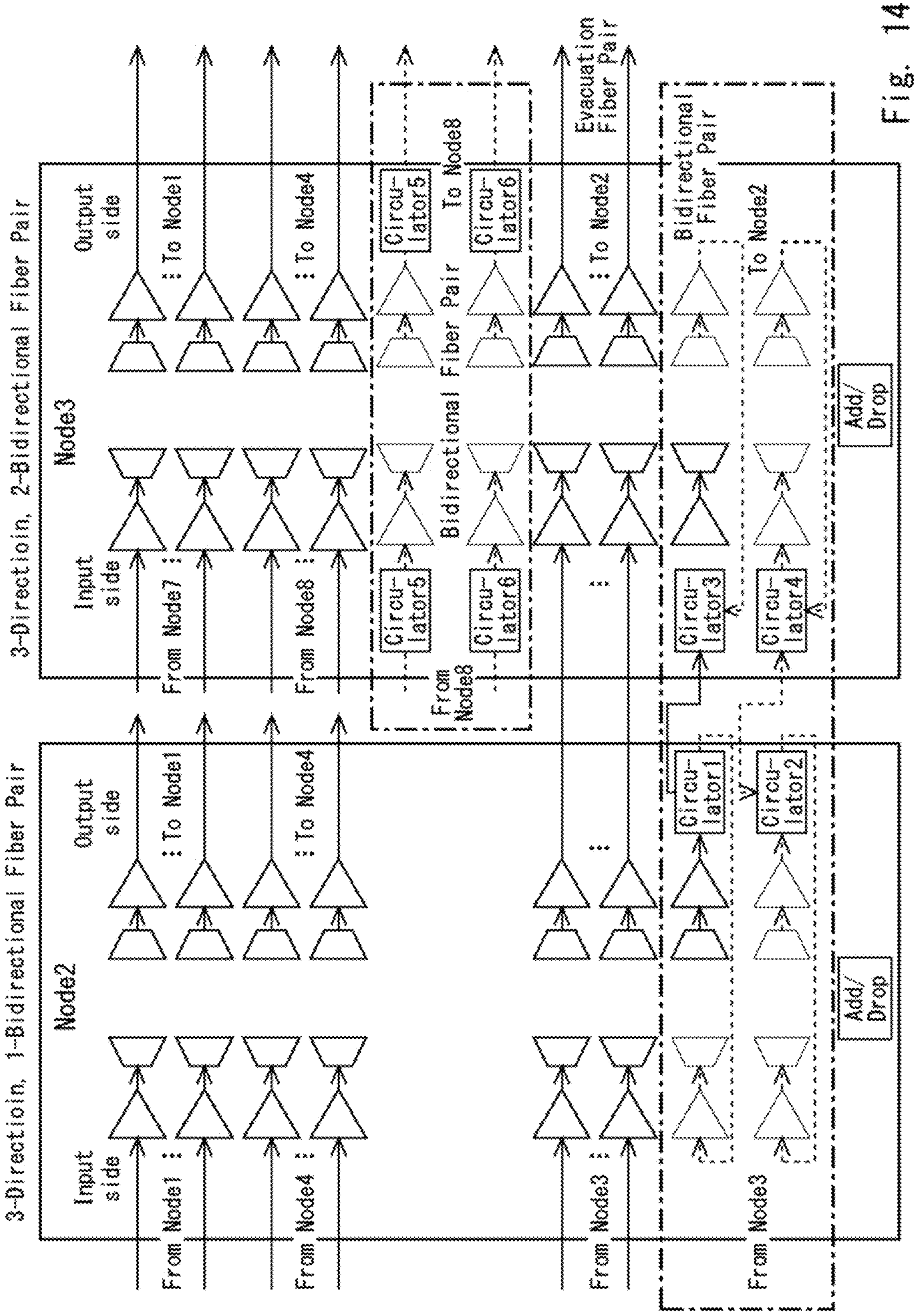
FIG. 14 is a block diagram showing an example of Nodes 2 and 3 according to the present disclosure.

FIG. 14 is also a block diagram showing an example of Nodes 2 and 3 according to the present disclosure.

Figure 15:
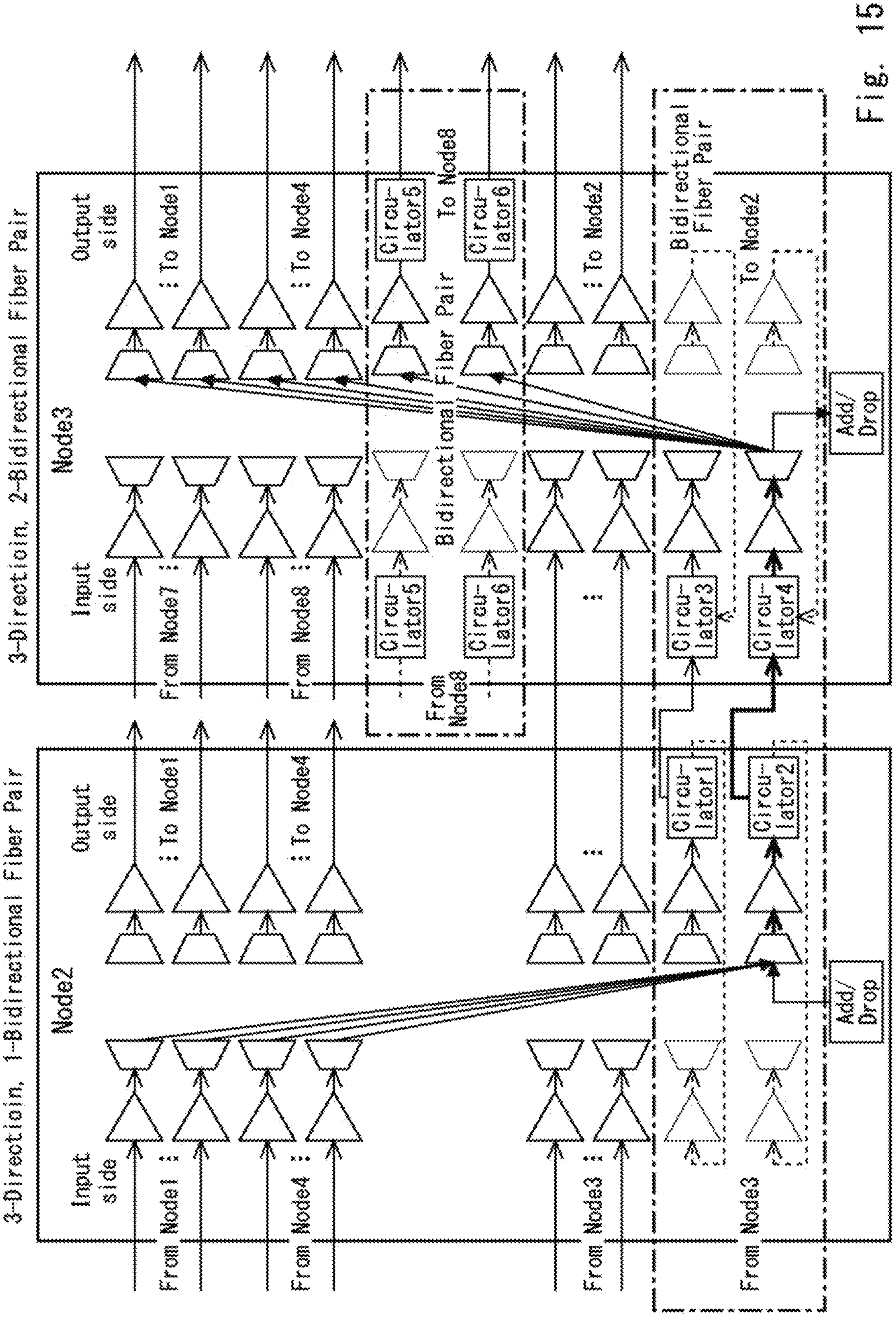
FIG. 15 is a block diagram showing an example of Nodes 2 and 3 according to the present disclosure.

FIG. 15 is also a block diagram showing an example of Nodes 2 and 3 according to the present disclosure.

It should be noted that in FIGS. 12 to 15, the optical transmission control apparatus is omitted for the sake of simplicity.

FIG. 12 is a detailed block diagram showing an example of Nodes 2 and 3 shown in FIG. 11.

FIG. 12 shows a connection state of bidirectional fibers connected between Nodes 2 and 3 before the switching from (Node 3→Node 2) to (Node 2→Node 3).

As shown in FIG. 12, in Node 2, ordinary fiber pairs are formed in three directions, i.e., between Node 2 and Nodes 1, 3 and 4, and a bidirectional fiber pair is formed only in one direction, i.e., between Node 2 and Node 3. In Node 3, ordinary fiber pairs are formed in three directions, i.e., between Node 3 and Nodes 2, 7 and 8, and a bidirectional fiber pair is formed in two directions, i.e., between Node 3 and Nodes 2 and 8.

FIG. 13 shows a connection state during the switching of the bidirectional fiber from (Node 3→Node 2) to (Node 2→Node 3) in which a fiber of (Node 2→Node 3) is selected as a saturated optical transmission path. In this connection state during the switching, a connection state between Nodes 2 and 3 during the evacuation of the connection of one fiber of a bidirectional fiber pair between Nodes 3 and 2 (connection through a path of Circulator 4→Circulator 2) to an evacuation fiber (evacuation optical transmission path) is shown.

As shown in FIG. 13, during the evacuation, among a plurality of bidirectional fiber pairs to (Node 3→Node 2), for example, a fiber connected to Circulators 2 and 4 is selected as a saturated optical transmission line (connection indicated by a broken line in FIG. 13). Then, among the plurality of bidirectional fiber pairs, a connection indicated by a solid line in FIG. 13 is specified as an evacuation optical transmission line to Node 2. Then, the connection of the saturated optical transmission line is changed to the connection to the evacuation optical transmission line, and traffic is evacuated and transferred.

FIG. 14 shows a connection state between Nodes 2 and 3 after the evacuation and transfer of traffic has been completed.

As shown in FIG. 14, after the evacuation and transfer of traffic is completed, the fiber connection is temporarily stopped in order to switch the bidirectional fiber from (Node 3→Node 2) to (Node 2→Node 3). It can be understood that the path-direction connection is not performed in Nodes 2 and 3.

FIG. 15 shows a connection state after the switching of both the bidirectional fibers (Node 2→Node 3) to (Node 2→Node 3) has been completed. Note that only the connections between WSSs related to the corresponding bidirectional fibers are shown for facilitating the understanding thereof.

As shown in FIG. 15, (Node 3→Node 2) is switched to the opposite direction, i.e., to (Node 2→Node 3), in order to sort out part of the data to be transmitted through the saturated optical transmission path thereto.

<Operation Sequence of Node>

Figure 16:
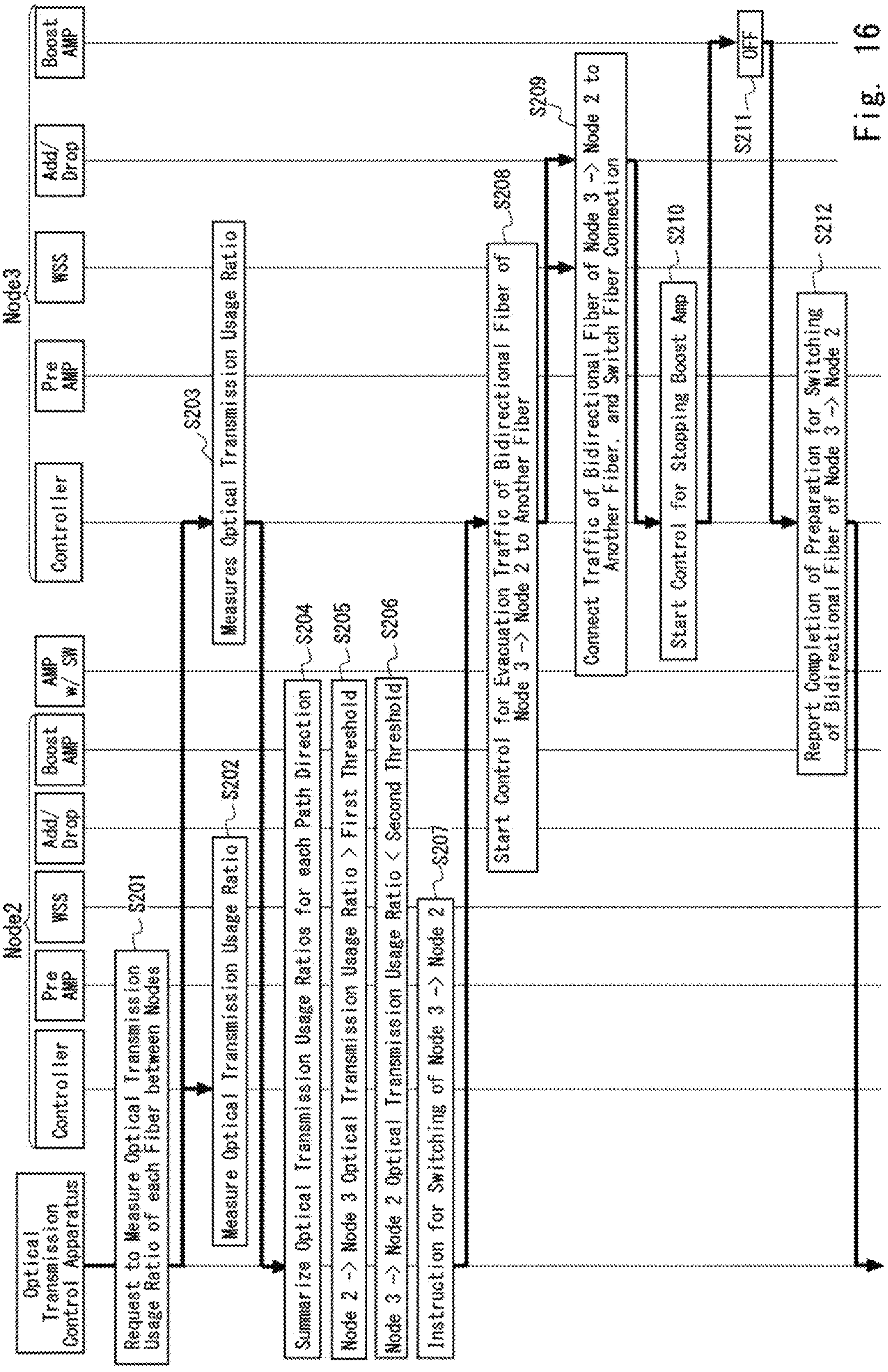
FIG. 16 is a sequence diagram showing operations performed by Nodes 2 and 3 according to the present disclosure.

FIG. 16 is a sequence diagram showing operations performed by Nodes 2 and 3 according to the present disclosure.

FIG. 16 shows a process up to when traffic is stopped in the direction (Node 3→Node 2) in the bidirectional fiber.

Figure 17:
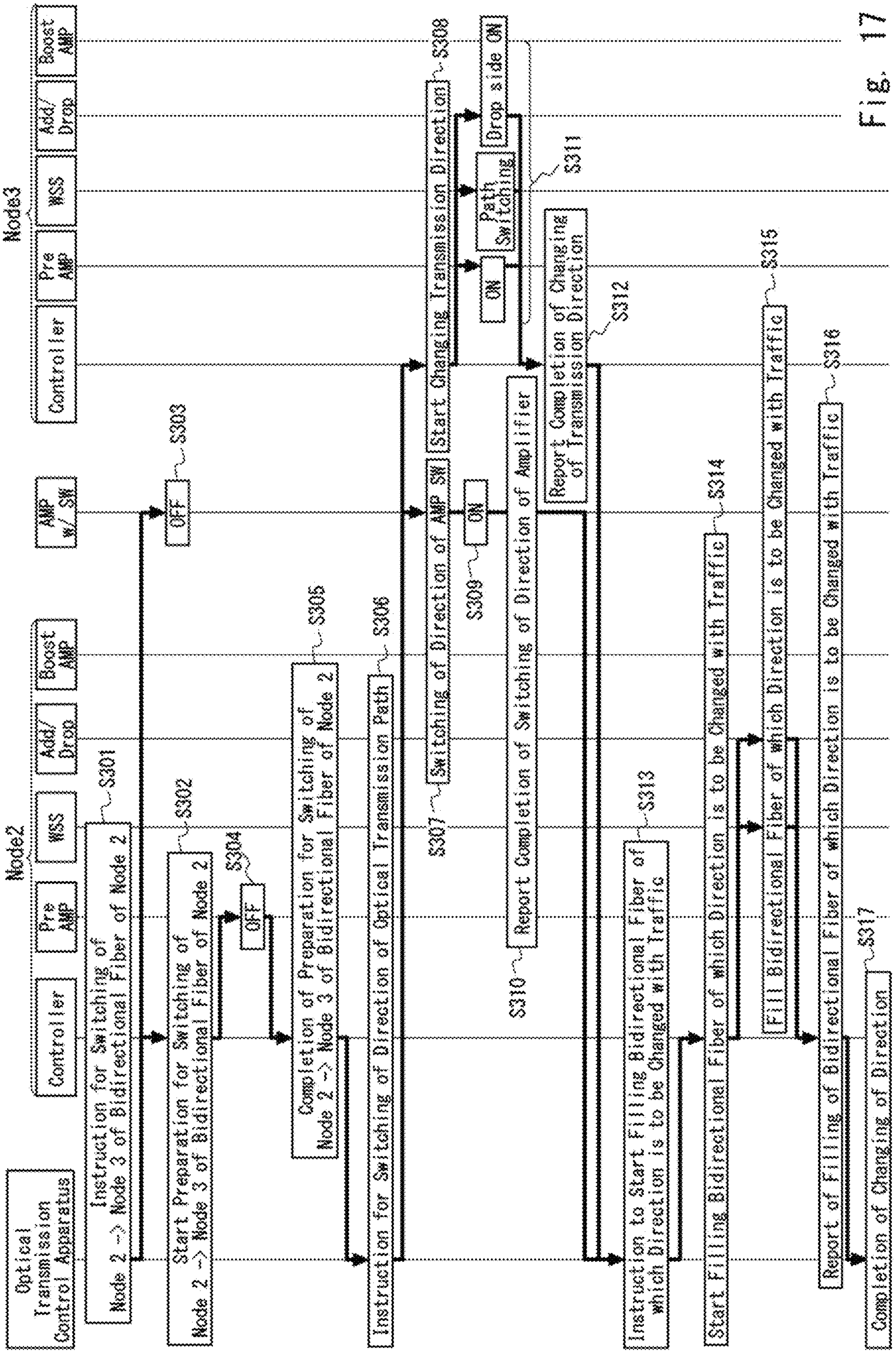
FIG. 17 is a sequence diagram showing operations performed by Nodes 2 and 3 according to the present disclosure.

FIG. 17 is a sequence diagram showing operations performed by Nodes 2 and 3 according to the present disclosure.

FIG. 17 shows a process up to when the optical transmission path is filled with traffic after the switching to the direction Node 2→Node 3.

As shown in FIG. 16, the optical transmission control apparatus 13 requests to measure an optical transmission usage ratio of each fiber between nodes (Step S201). Each of Nodes 2 and 3 measures an optical transmission usage ratio (filling ratio) (Step S202 and S203). The optical transmission control apparatus 13 acquires the optical transmission usage ratio from each of Nodes 2 and 3 and summarizes (e.g., adds up) the optical transmission usage ratios for each path direction (e.g., for each of the downlink and the uplink) (Step S204).

The optical transmission control apparatus 13 selects a saturated optical transmission path of which the optical transmission usage ratio of (Node 2→Node 3) exceeds a first threshold (Step S205). Further, the optical transmission control apparatus 13 also specifies an evacuation optical transmission path of which the optical transmission usage ratio of (Node 3→Node 2) is lower than a second threshold (Step S206). The optical transmission control apparatus 13 provides a switching instruction to switch from (Node 3→Node 2) to (Node 2→Node 3) to Node 3 (Step S207). Note that the terms "amplifier" and "AMP" represent an optical amplifier.

Node 3 starts to evacuate traffic of the bidirectional fiber (saturated optical transmission path) of (Node 3→Node 2) to another fiber (evacuation optical transmission path) (Step S208). Therefore, Node 3 connects the traffic of the bidirectional fiber of (Node 3→Node 2) to the other fiber, and switches the fiber connection (Step S209). Node 3 starts control for stopping the Boost AMP (Step S210). Node 3 stops (turns off) the operation of the Boost AMP (Step S211). Node 3 reports, to the optical transmission control apparatus, that the preparation for the switching of the bidirectional fiber of (Node 3→Node 2) has been completed (Step S212).

As shown in FIG. 17, the optical transmission control apparatus 13 provides an instruction to switch the bidirectional fiber of Node 2 (Node 2→Node 3) to Node 2 and the AMP SW (amplifier switching switch) (Step S301). The AMP SW stops (turns off) the connection to the amplifier.

Node 2 starts the preparation for switching the bidirectional fiber of Node 2 (Node 2→Node 3) (Step S302). Node 2 stops (turns off) the Pre AMP (Step S304). Node 2 reports, to the optical transmission control apparatus 13, that the preparation for switching of the bidirectional fiber of Node 2 (Node 2→Node 3) has been completed (Step S305). The optical transmission control apparatus 13 provides an instruction to switch the direction of the optical transmission path to Node 3 and the AMP SW (Step S306).

Node 3 starts the change of the transmission direction (Step S308). Node 3 turns on the Pre AMP, performs path switching, and turns on the Drop side (Step S311). Node 3 reports, to the optical transmission control apparatus 13, that the transmission direction has been changed (Step S312).

Upon receiving the optical transmission path direction switching instruction, the AMP SW switches the connection direction to the amplifier (Step S307). The AMP SW starts (turns on) the connection to the amplifier (Step S309). The AMP SW provides an amplifier direction switching completion report to the optical transmission control apparatus 13 (Step S310).

The optical transmission control apparatus 13 provides, to Node 2, an instruction to start filling (e.g., supplying) the bidirectional fiber (counterpart optical transmission path) of which the direction is to be changed with traffic (Step S313). That is, the optical transmission control apparatus 13 provides, to Node 2, an instruction to fill the counterpart optical transmission path with part of the data to be transmitted through the saturated optical transmission path. Node 2 starts filling the bidirectional fiber of which the direction is to be changed with traffic (Step S314). Node 2 fills the bidirectional fiber of which the direction is to be changed with traffic (Step S315). Node 2 reports, to the optical transmission control apparatus 13, that the filling of the bidirectional fiber of which the direction is to be changed with traffic has been completed (Step S316). The optical transmission control apparatus 13 acquires the information indicating that the direction change has been completed (Step S317).

Modified Example

Figure 18:
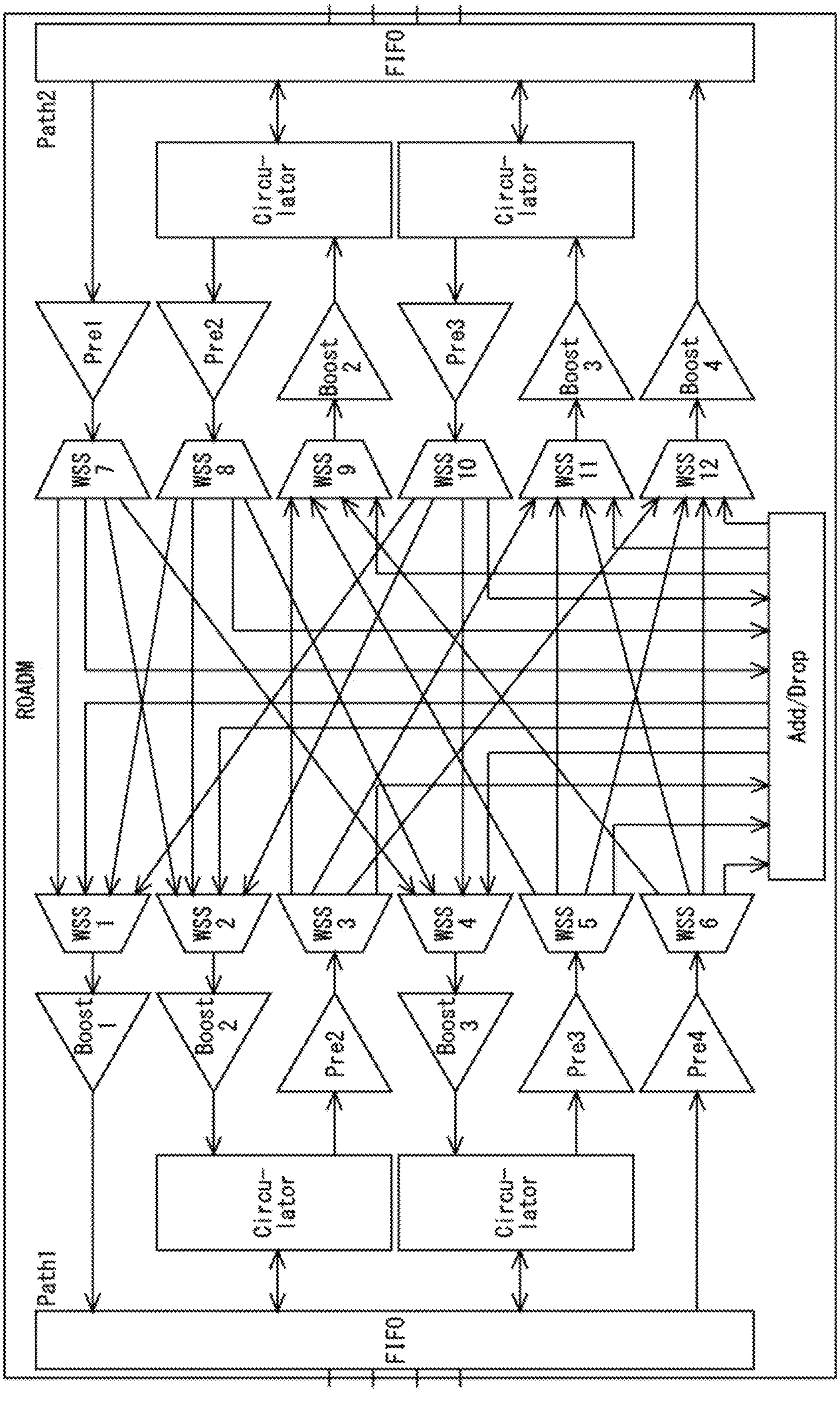
FIG. 18 is a block diagram showing an example of a ROADM according to the present disclosure.

FIG. 18 is a block diagram showing an example of a ROADM according to the present disclosure.

As shown in FIG. 18, the ROADM can insert a multi-core FIFO (Fan In/Fan Out) in the input/output side, and bidirectionally switch the communication direction in at least one core in one fiber.

Note that although the present disclosure is described as a hardware configuration in the above-described example embodiments, the present disclosure is not limited to the hardware configurations. In the present disclosure, the processes in each of the components can also be implemented by having a CPU (Central Processing Unit) execute a computer program.

In the above-described example embodiments, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, although operations are described in a specific order, this should not be understood that they need to be performed in the above-shown specific or sequential order in order to achieve the desired result, or all of the above-shown operations need to be performed. In certain situations, multi-tasking and parallel processing may be advantageous. Similarly, although the details of some specific example embodiments are included in the discussion above, they should be interpreted not as a restriction on the scope of the present disclosure but as an explanation of features unique to the specific example embodiments. Specific features described in the context of individual example embodiments may be implemented in combination in one example embodiment. Conversely, various features described in the context of one example embodiment may be implemented separately in a plurality of example embodiments, or may be implemented in any suitable combination thereof. According to the present disclosure, it is possible to provide an optical transmission control apparatus, an optical transmission system, a method for an optical transmission control apparatus, and a program capable of changing the transmission capacities of optical transmission lines based on the amounts of data to be transmitted therethrough.

Although the present disclosure is described above with reference to example embodiments, the present disclosure is not limited to the above-described example embodiments. Various modifications that can be understood by those skilled in the art can be made to the configuration and details of the present disclosure within the scope and spirit of the disclosure. Further, the example embodiments may be combined with one another as appropriate.

Each of the drawings is merely an example to illustrate one or more embodiments. Each of the drawing is not associated with only one specific embodiment, but may be associated with one or more other embodiments. As will be understood by those skilled in the art, various features or steps described with reference to any one of the drawings may be combined with features or steps shown in one or more other drawings in order to create, for example, an embodiment that is not explicitly shown in the drawings or described in the specification. Not all of the features or steps shown in any one of the drawings to describe an embodiment are necessarily indispensable, and some features or steps may be omitted. The order of steps in any of the drawings may be changed as appropriate.

Note that the present disclosure is not limited to the example embodiments described above, and they may be modified as appropriate without departing from the scope and spirit of the disclosure.

Further, the whole or part of the example embodiments disclosed above can be described as, but not limited to, the following supplementary notes.

(Supplementary Note 1)

An optical transmission control apparatus comprising:

a selecting unit configured to select a saturated optical transmission path of which an optical transmission usage ratio exceeds a first threshold from among a plurality of optical transmission paths connected between a first optical transmission apparatus and a second optical transmission apparatus;

a specifying unit configured to specify an evacuation optical transmission path of which an optical transmission direction is opposite to that of the saturated optical transmission path and of which an optical transmission usage ratio is lower than a second threshold from among the plurality of optical transmission paths;

a control unit configured to transmit, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path; and a path-direction switching unit configured to transmit a switching control signal for switching the optical transmission direction of the counterpart optical transmission path to an opposite direction to the first and second optical transmission apparatuses after the transfer of the data to be transmitted through the counterpart optical transmission path is completed, in which the control unit transmits, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

(Supplementary Note 2)

The optical transmission control apparatus described in Supplementary note 1, wherein the second threshold is lower than the first threshold.

(Supplementary Note 3)

The optical transmission control apparatus described in Supplementary note 1, wherein each of the first and second optical transmission apparatuses is formed by a ROADM (Reconfigurable Optical Add/Drop Multiplexer) apparatus.

(Supplementary Note 4)

The optical transmission control apparatus described in Supplementary note 1, further comprising a plurality of optical amplifiers each of which is configured to amplify data to be transmitted through a respective one of the plurality of optical transmission paths.

(Supplementary Note 5)

An optical transmission system comprising:

a first optical transmission apparatus, a second optical transmission apparatus, a plurality of optical transmission paths connected between the first and second optical transmission apparatuses, and an optical transmission control apparatus configured to control the first and second optical transmission apparatuses, wherein the plurality of optical transmission paths include at least a first optical transmission path and a second optical transmission path, in the first optical transmission path, a first downlink optical transmission path from the first optical transmission apparatus toward the second optical transmission apparatus and a first uplink optical transmission path from the second optical transmission apparatus toward the first optical transmission apparatus form a pair, in the second optical transmission path, a second downlink optical transmission path from the first optical transmission apparatus toward the second optical transmission apparatus and a second uplink optical transmission path from the second optical transmission apparatus toward the first optical transmission apparatus form a pair, the optical transmission control apparatus comprises:

a selecting unit configured to select a saturated optical transmission path of which an optical transmission usage ratio exceeds a first threshold from among the plurality of optical transmission paths, a specifying unit configured to specify an evacuation optical transmission path of which an optical transmission direction is opposite to that of the saturated optical transmission path and of which an optical transmission usage ratio is lower than a second threshold from among the plurality of optical transmission paths;

a control unit configured to transmit, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path; and a path-direction switching unit configured to transmit a switching control signal for switching the optical transmission direction of the counterpart optical transmission path to an opposite direction to the first and second optical transmission apparatuses after the transfer of the data to be transmitted through the counterpart optical transmission path is completed, the control unit transmits, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction, the first optical transmission apparatus comprises a first optical switching unit, a first downlink wavelength selecting switching unit, and a first uplink wavelength selecting switching unit, the first optical transmission apparatus further comprises a first optical control unit configured to control the first optical switching unit and the first downlink wavelength selecting switching unit or the first uplink wavelength selecting switching unit in order to transfer data to be transmitted through the counterpart optical transmission path based on the transfer control signal so that the data is transmitted through the evacuation optical transmission path, the first optical transmission apparatus further comprises a first optical transmission/reception switching unit configured to control the first optical switching unit and the first downlink wavelength selecting switching unit or the first uplink wavelength selecting switching unit in order to switch the optical transmission direction of the counterpart optical transmission path to an opposite direction based on the switching control signal after the transfer of the data to be transmitted through the counterpart optical transmission path is completed, the first control unit sorts out part of the data to be transmitted through the saturated optical transmission path to the counterpart optical transmission path based on the sorting-out control signal after the optical transmission direction of the counterpart optical transmission path is switched to the opposite direction;

the second optical transmission apparatus comprises a second optical switching unit, a second downlink wavelength selecting switching unit, and a second uplink wavelength selecting switching unit, the second optical transmission apparatus further comprises a second optical control unit configured to control the second optical switching unit and the second downlink wavelength selecting switching unit or the second uplink wavelength selecting switching unit in order to transfer data to be transmitted through the counterpart optical transmission path based on the transfer control signal so that the data is transmitted through the evacuation optical transmission path, the second optical transmission apparatus further comprises a second optical transmission/reception switching unit configured to control the second optical switching unit and the second downlink wavelength selecting switching unit or the second uplink wavelength selecting switching unit in order to switch the optical transmission direction of the counterpart optical transmission path to an opposite direction based on the switching control signal after the transfer of the data to be transmitted through the counterpart optical transmission path is completed, and the second control unit sorts out part of the data to be transmitted through the saturated optical transmission path to the counterpart optical transmission path based on the sorting-out control signal after the optical transmission direction of the counterpart optical transmission path is switched to the opposite direction.

(Supplementary Note 6)

The optical transmission system described in Supplementary note 5, wherein the first optical transmission apparatus further comprises a wavelength conversion unit configured to, when an evacuation optical wavelength of an optical carrier wave for conveying data to be transmitted through the evacuation optical transmission path and a counterpart optical wavelength of the optical carrier wave for conveying data to be transmitted through the counterpart optical transmission path are the same as each other, convert the counterpart optical wavelength into a wavelength different from the evacuation optical wavelength.

(Supplementary Note 7)

The optical transmission system described in Supplementary note 5, wherein each of the first and second optical switching units is an optical switch or an optical circulator.

(Supplementary Note 8)

The optical transmission system described in Supplementary note 5, wherein each of the first downlink wavelength selecting switching unit, the first uplink wavelength selecting switching unit, the second downlink wavelength selecting switching unit, and the second uplink wavelength selecting switching unit is a wavelength selective switch (WSS: Wavelength Selective Switch).

(Supplementary Note 9)

A method for an optical transmission control apparatus, comprising:

selecting a saturated optical transmission path of which an optical transmission usage ratio exceeds a first threshold from among a plurality of optical transmission paths connected between a first optical transmission apparatus and a second optical transmission apparatus;

specifying an evacuation optical transmission path of which an optical transmission direction is opposite to that of the saturated optical transmission path and of which an optical transmission usage ratio is lower than a second threshold from among the plurality of optical transmission paths;

transmitting, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path;

transmitting a switching control signal for switching the optical transmission direction of the counterpart optical transmission path to an opposite direction to the first and second optical transmission apparatuses after the transfer of the data to be transmitted through the counterpart optical transmission path is completed; and transmitting, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

(Supplementary Note 10)

The optical transmission system described in Supplementary note 5, wherein the second threshold is lower than the first threshold.

(Supplementary Note 11)

The optical transmission system described in Supplementary note 5, wherein each of the first and second optical transmission apparatuses is formed by a ROADM (Reconfigurable Optical Add/Drop Multiplexer) apparatus.

(Supplementary Note 12)

The optical transmission system described in Supplementary note 5, further comprising a plurality of optical amplifiers each of which is configured to amplify data to be transmitted through a respective one of the plurality of optical transmission paths.

(Supplementary Note 13)

The method for an optical transmission control apparatus described in Supplementary note 9, wherein the second threshold is lower than the first threshold.

(Supplementary Note 14)

The method for an optical transmission control apparatus described in Supplementary note 9, wherein each of the first and second optical transmission apparatuses is formed by a ROADM (Reconfigurable Optical Add/Drop Multiplexer) apparatus.

(Supplementary Note 15)

The method for an optical transmission control apparatus described in Supplementary note 9, wherein the optical transmission control apparatus further comprises a plurality of optical amplifiers each of which is configured to amplify data to be transmitted through a respective one of the plurality of optical transmission paths.

What is claimed is:

1. An optical transmission control apparatus comprising:

at least one memory storing instructions; and at least one processor configured to execute the instructions to:

select a saturated optical transmission path of which an optical transmission usage ratio exceeds a first threshold from among a plurality of optical transmission paths connected between a first optical transmission apparatus and a second optical transmission apparatus;

specify an evacuation optical transmission path of which an optical transmission direction is opposite to that of the saturated optical transmission path and of which an optical transmission usage ratio is lower than a second threshold from among the plurality of optical transmission paths;

transmit, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path; and transmit a switching control signal for switching the optical transmission direction of the counterpart optical transmission path to an opposite direction to the first and second optical transmission apparatuses after the transfer of the data to be transmitted through the counterpart optical transmission path is completed, wherein the processor is further configured to transmit, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

2. The optical transmission control apparatus according to claim 1, wherein the second threshold is lower than the first threshold.

3. The optical transmission control apparatus according to claim 1, wherein each of the first and second optical transmission apparatuses is formed by a ROADM (Reconfigurable Optical Add/Drop Multiplexer) apparatus.

4. The optical transmission control apparatus according to claim 1, further comprising a plurality of optical amplifiers each of which is configured to amplify data to be transmitted through a respective one of the plurality of optical transmission paths.

5. An optical transmission system comprising:

a first optical transmission apparatus, a second optical transmission apparatus, a plurality of optical transmission paths connected between the first and second optical transmission apparatuses, and an optical transmission control apparatus configured to control the first and second optical transmission apparatuses, wherein the plurality of optical transmission paths include at least a first optical transmission path and a second optical transmission path, in the first optical transmission path, a first downlink optical transmission path from the first optical transmission apparatus toward the second optical transmission apparatus and a first uplink optical transmission path from the second optical transmission apparatus toward the first optical transmission apparatus form a pair, in the second optical transmission path, a second downlink optical transmission path from the first optical transmission apparatus toward the second optical transmission apparatus and a second uplink optical transmission path from the second optical transmission apparatus toward the first optical transmission apparatus form a pair, the optical transmission control apparatus comprises:

at least one memory for the optical transmission control apparatus, storing instructions; and at least one processor for the optical transmission control apparatus, configured to execute the instructions to:

select a saturated optical transmission path of which an optical transmission usage ratio exceeds a first threshold from among the plurality of optical transmission paths, specify an evacuation optical transmission path of which an optical transmission direction is opposite to that of the saturated optical transmission path and of which an optical transmission usage ratio is lower than a second threshold from among the plurality of optical transmission paths;

transmit, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path; and transmit a switching control signal for switching the optical transmission direction of the counterpart optical transmission path to an opposite direction to the first and second optical transmission apparatuses after the transfer of the data to be transmitted through the counterpart optical transmission path is completed, the processor for the optical transmission control apparatus is further configured to transmit, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction, the first optical transmission apparatus comprises: at least one memory for the first optical transmission apparatus, storing instructions; at least one processor for the first optical transmission apparatus, configured to execute the instructions; a first optical switching unit; a first downlink wavelength selecting switching unit; and a first uplink wavelength selecting switching unit, the processor for the first optical transmission apparatus is configured to:

control the first optical switching unit and the first downlink wavelength selecting switching unit or the first uplink wavelength selecting switching unit in order to transfer data to be transmitted through the counterpart optical transmission path based on the transfer control signal so that the data is transmitted through the evacuation optical transmission path;

control the first optical switching unit and the first downlink wavelength selecting switching unit or the first uplink wavelength selecting switching unit in order to switch the optical transmission direction of the counterpart optical transmission path to an opposite direction based on the switching control signal after the transfer of the data to be transmitted through the counterpart optical transmission path is completed; and sort out part of the data to be transmitted through the saturated optical transmission path to the counterpart optical transmission path based on the sorting-out control signal after the optical transmission direction of the counterpart optical transmission path is switched to the opposite direction;

the second optical transmission apparatus comprises: at least one memory for the second optical transmission apparatus, storing instructions; at least one processor for the second optical transmission apparatus, configured to execute the instructions; a second optical switching unit; a second downlink wavelength selecting switching unit; and a second uplink wavelength selecting switching unit, and the processor for the second optical transmission apparatus is configured to:

control the second optical switching unit and the second downlink wavelength selecting switching unit or the second uplink wavelength selecting switching unit in order to transfer data to be transmitted through the counterpart optical transmission path based on the transfer control signal so that the data is transmitted through the evacuation optical transmission path, control the second optical switching unit and the second downlink wavelength selecting switching unit or the second uplink wavelength selecting switching unit in order to switch the optical transmission direction of the counterpart optical transmission path to an opposite direction based on the switching control signal after the transfer of the data to be transmitted through the counterpart optical transmission path is completed, and sort out part of the data to be transmitted through the saturated optical transmission path to the counterpart optical transmission path based on the sorting-out control signal after the optical transmission direction of the counterpart optical transmission path is switched to the opposite direction.

6. The optical transmission system according to claim 5, wherein the first optical transmission apparatus further comprises a wavelength conversion unit configured to, when an evacuation optical wavelength of an optical carrier wave for conveying data to be transmitted through the evacuation optical transmission path and a counterpart optical wavelength of the optical carrier wave for conveying data to be transmitted through the counterpart optical transmission path are the same as each other, convert the counterpart optical wavelength into a wavelength different from the evacuation optical wavelength.

7. The optical transmission system according to claim 5, wherein each of the first and second optical switching units is an optical switch or an optical circulator.

8. The optical transmission system according to claim 5, wherein each of the first downlink wavelength selecting switching unit, the first uplink wavelength selecting switching unit, the second downlink wavelength selecting switching unit, and the second uplink wavelength selecting switching unit is a wavelength selective switch (WSS: Wavelength Selective Switch).

9. The optical transmission system according to claim 5, wherein the second threshold is lower than the first threshold.

10. The optical transmission system according to claim 5, wherein each of the first and second optical transmission apparatuses is formed by a ROADM (Reconfigurable Optical Add/Drop Multiplexer) apparatus.

11. The optical transmission system according to claim 5, further comprising a plurality of optical amplifiers each of which is configured to amplify data to be transmitted through a respective one of the plurality of optical transmission paths.

12. A method for an optical transmission control apparatus, comprising:

selecting a saturated optical transmission path of which an optical transmission usage ratio exceeds a first threshold from among a plurality of optical transmission paths connected between a first optical transmission apparatus and a second optical transmission apparatus;

specifying an evacuation optical transmission path of which an optical transmission direction is opposite to that of the saturated optical transmission path and of which an optical transmission usage ratio is lower than a second threshold from among the plurality of optical transmission paths;

transmitting, to the first and second optical transmission apparatuses, a transfer control signal for transferring data to be transmitted through a counterpart optical transmission path to the evacuation optical transmission path, the counterpart optical transmission path being an optical transmission path which is paired with the saturated optical transmission path and of which an optical transmission direction is opposite to that of the saturated optical transmission path;

transmitting a switching control signal for switching the optical transmission direction of the counterpart optical transmission path to an opposite direction to the first and second optical transmission apparatuses after the transfer of the data to be transmitted through the counterpart optical transmission path is completed; and transmitting, to the first and second optical transmission apparatuses, a sorting-out control signal for sorting out part of the data to be transmitted through the saturated optical transmission path to the counterpart optical transmission path after the optical transmission direction of the counterpart optical transmission path is switched to the opposite direction.

13. The method for an optical transmission control apparatus according to claim 12, wherein the second threshold is lower than the first threshold.

14. The method for an optical transmission control apparatus according to claim 12, wherein each of the first and second optical transmission apparatuses is formed by a ROADM (Reconfigurable Optical Add/Drop Multiplexer) apparatus.

15. The method for an optical transmission control apparatus according to claim 12, wherein the optical transmission control apparatus further comprises a plurality of optical amplifiers each of which is configured to amplify data to be transmitted through a respective one of the plurality of optical transmission paths.

* * * * *